(12) United States Patent
Chen et al.

(10) Patent No.: US 11,078,593 B2
(45) Date of Patent: Aug. 3, 2021

(54) RADIATIVE COOLING SUBSTRATE AND MANUFACTURING METHOD OF THE SAME

(71) Applicant: NATIONAL TSING HUA UNIVERSITY, Hsinchu (TW)

(72) Inventors: Yu-Bin Chen, Hsinchu (TW); Hung-Sheng Han, Chiayi County (TW)

(73) Assignee: National Tsing Hua University, Hsinchu (TW)

( * ) Notice: Subject to any disclaimer, the term of this patent is extended or adjusted under 35 U.S.C. 154(b) by 61 days.

(21) Appl. No.: 16/282,747

(22) Filed: Feb. 22, 2019

(65) Prior Publication Data

US 2020/0131660 A1 Apr. 30, 2020

(30) Foreign Application Priority Data

Oct. 31, 2018 (TW) .................................. 107138663

(51) Int. Cl.
| | |
|---|---|
| *C25D 13/06* | (2006.01) |
| *C25D 13/12* | (2006.01) |
| *C25D 13/20* | (2006.01) |
| *F28F 13/18* | (2006.01) |
| *C25D 13/22* | (2006.01) |

(52) U.S. Cl.
CPC ............. *C25D 13/06* (2013.01); *C25D 13/12* (2013.01); *C25D 13/20* (2013.01); *C25D 13/22* (2013.01); *F28F 13/18* (2013.01); *F28F 2245/06* (2013.01)

(58) Field of Classification Search
None
See application file for complete search history.

(56) References Cited

U.S. PATENT DOCUMENTS

2015/0147468 A1* 5/2015 Diehn .................. C09D 105/04
427/207.1
2018/0352857 A1* 12/2018 Karles ..................... C09D 5/44

FOREIGN PATENT DOCUMENTS

TW 201701041 A 1/2017

* cited by examiner

*Primary Examiner* — Kishor Mayekar
(74) *Attorney, Agent, or Firm* — Muncy, Geissler, Olds & Lowe, P.C.

(57) ABSTRACT

A radiative cooling substrate and a manufacturing method of the radiative cooling substrate are provided. The radiative cooling substrate includes a metallic substrate and a chitosan layer disposed on the metallic substrate with a thickness of 0.5 μm to 10 μm. The chitosan layer emits radiation within a waveband between 8 μm and 13 μm.

6 Claims, 28 Drawing Sheets

RADIATIVE COOLING SUBSTRATE AND MANUFACTURING METHOD OF THE SAME

CROSS-REFERENCE TO RELATED APPLICATION

This application claims priority from Taiwan Application No. 107138663, filed on Oct. 31, 2018, in the Taiwan Intellectual Property Office, the content of which is hereby incorporated by reference in their entirety for all purposes.

BACKGROUND OF THE INVENTION

1. Field of the Invention

The present invention relates to a radiative cooling substrate and a manufacturing method of the radiative cooling substrate. Specifically, the present invention relates to a radiative cooling substrate and a manufacturing method of the radiative cooling substrate using the passive radiation cooling effect of a deposited chitosan layer.

2. Description of the Related Art

Thermal energy dissipation devices are needed for various kinds of instruments, machines, and pipes in daily life for maintaining proper operation temperatures. Radiative cooling method utilizes thermal radiation as the only way for transporting thermal energy, and the velocity is identical to the light speed. Further, no media and energy consumption are needed. According to the Stefan-Boltzmann law, space may be regarded as a huge heat sink having a temperature of 3 K. When an object located on the earth exchanges heat with space, the energy of the radiative heat transport is proportional to the temperature of the fourth power. High radiative heat flux is emitted to reduce temperature of the object surface and dissipate the thermal energy. Accordingly, development of a radiative cooling substrate is very promising.

However, an effective radiative cooling substrate must have low emissions in the waveband of solar radiation but have high emissions in the waveband of the atmospheric window (8 µm to 13 µm). Present radiative cooling substrates usually have a coating capable of emitting radiation of the atmospheric window or a structure combined with one-dimensional photonic crystals or metamaterials. For example, the coating may be a polyethene layer, a silicon oxide layer and so on as a wavelength selective infrared radiation layer. However, these kinds of layers tend to absorb solar radiation of other wavebands and are hence unsuitable for daytime applications. Further, for the foregoing structures combined with one-dimensional photonic crystals or metamaterials, there are some restrictions such as a complicate manufacturing process, including a requirement of coating an additional silver or aluminum layer with a thickness of several nanometers as a reflecting layer, which affects the general use of the structure.

Consequently, it is necessary to develop a radiative cooling substrate having functions of passive radiative cooling, working in daytime, and withholding fabrication easiness.

SUMMARY OF THE INVENTION

For the purpose of solving the foregoing problems, the present invention provides a radiative cooling substrate and a manufacturing method of the radiative cooling substrate. The main technical features of the present invention include depositing a chitosan layer on a metallic substrate in an electrophoretic process. In this way, the radiative cooling substrate does not absorb waves of solar radiation but has a high emissivity in the atmospheric window.

According to one purpose of the present invention, a manufacturing method of a radiative cooling substrate is provided. The method includes: preparing a chitosan solution, wherein the chitosan solution includes chitosan and a solvent, the solvent is selected from a group consisting of water, C1-C4 alcohols, organic acids and inorganic acids, and the pH-value of the chitosan solution is less than seven; providing a metallic substrate into an electrophoresis cell loaded with the chitosan solution; applying a voltage to the metallic substrate for a predetermined time period; depositing a chitosan layer including the chitosan with a first thickness on the metallic substrate in an electrophoretic process; and obtaining the radiative cooling substrate; wherein the first thickness is 0.5 µm to 10 µm.

In a preferred embodiment of the present invention, the manufacturing method of the radiative cooling substrate may include: before providing the metallic substrate into the electrophoresis cell loaded with the chitosan solution, forming the metallic substrate by depositing an adhesive layer with a second thickness on a silicon substrate and depositing a metal layer on the adhesive layer in an evaporation process; wherein the adhesive layer includes chromium (Cr) or titanium (Ti), and the second thickness is 10 nm to 50 nm.

In another preferred embodiment of the present invention, a ratio of a weight (g) of the chitosan and a volume (mL) of the solvent may be 0.01 g: 1000 mL to 20 g: 1000 mL.

In yet another preferred embodiment of the present invention, the solvent may include water and ethyl alcohol and a volume ratio of the water and the ethyl alcohol is less than 2:8.

In yet another preferred embodiment of the present invention, the solvent may include acetic acids or hydrochloric acids.

In yet another preferred embodiment of the present invention, the voltage may be less than 30 V.

In yet another preferred embodiment of the present invention, the predetermined time period may be less than five minutes.

According to another purpose of the present invention, a radiative cooling substrate is provided. The substrate includes: a metallic substrate; and a chitosan layer, disposed on the metallic substrate and have a thickness of 0.5 µm to 10 µm; wherein the chitosan layer emits radiation within a waveband between 8 µm and 13 µm.

In yet another preferred embodiment of the present invention, the metallic substrate may include: a silicon substrate; a metal layer, disposed on the silicon substrate; and an adhesive layer, disposed between the silicon substrate and the metal layer with a thickness of 10 nm to 50 nm and including Cr or Ti.

The radiative cooling substrate and the manufacturing method thereof of the present invention have advantages described below:

(1) Generally, metal has high reflectance not only in the spectral range of the solar radiation (0.28 µm to 4 µm) but also in the atmospheric window, and it hence reflect most of the incident solar radiation. Relatively speaking, metal does not have a high emission in the atmospheric window and hence cannot dissipate thermal energy via radiative cooling. The radiative cooling substrate of the present invention makes use of the metal to reflect the incident solar radiation and makes use of the chitosan layer to massively emit the radiation of the atmospheric window so as to radiatively dissipate thermal energy.

(2) Since the weakly acidic chitosan solution will produce a chitosan layer on the surface of the cathode by an electrophoretic deposition process, the adhesive force between the silicon substrate and the metal layer deposited on the silicon substrate needs to be enhanced to prevent the metal layer from flaking off the silicon substrate. Therefore, in addition to a complete clean process for the substrate surface, an adhesive layer is further disposed in the radiative cooling substrate of the present invention for enhancement of the adhesive force.

(3) The radiative cooling substrate of the present invention, even in the daytime, may dissipate thermal energy by emitting radiation through the atmospheric window without the input of energy (such as energy consumption of active cooling system). That is, the radiative cooling substrate of the present invention has overcome the restrictions of radiative cooling in the daytime. Therefore, the radiative cooling substrate of the present invention may operate both in the nighttime and daytime. Furthermore, the radiative cooling substrate of the present invention may be broadly applied in various devices such as metallic pipelines, transportation vehicles, metal storage tank, metal-sheet house and so on.

(4) Since the natural chitosan is selected as the deposition material, the radiative cooling substrate of the present invention is biocompatible, non-toxic and decomposable and would not cause harm to the environment. Furthermore, since chitosan may be extracted from waste such as shrimp shells, crab shells, and so on, commercial value of the particular waste previously mentioned improves with the present invention.

(5) In comparison with the coating method in which a strong base solution is needed, the manufacturing method of the radiative cooling substrate of the present invention makes use of an water-based electrophoretic deposition process may not only provide a firmer deposition layer but also cause less harm to the environment, simplify the manufacturing process and reduce the production cost. In addition, the electrophoretic deposition process has big deposition areas, rarely produces creases or develops thermal contact resistance, and is not restricted by the shape of the substrate.

(6) In the manufacturing method of the radiative cooling substrate of the present invention, the characteristics of the deposited chitosan layer may be correspondingly modified by modifying parameters relating to the predetermined time period, the applied voltage and the composition of the chitosan solution. In the present invention, a part of water in the solvent is replaced by ethyl alcohol to prevent bubbles in the electrophoretic deposition process and the non-uniform coating of the chitosan layer.

DETAILED DESCRIPTION OF THE PREFERRED EMBODIMENTS

The advantages, features and technical methods of this invention will be described in detail in order to be understood easier. Moreover, the present invention may be realized in different form and should not be limited to the embodiments described here. On the contrary, the provided embodiments make the disclosure clear and define the scope of this invention entirely and completely. Further, the present invention is only defined according to the attached claims.

Figure 1:
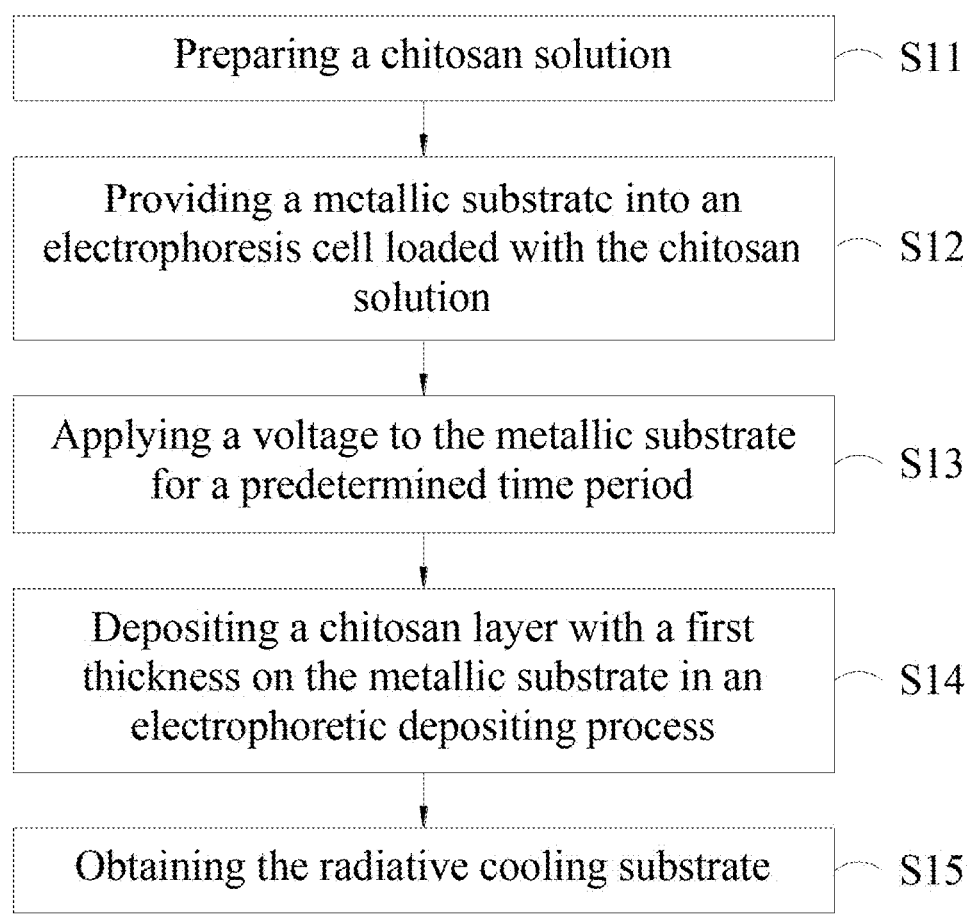
FIG. 1 depicts a flow chart of the manufacturing method of the radiative cooling substrate according to an embodiment of the present invention.

Refer to FIG. 1, which depicts a flow chart of the manufacturing method of the radiative cooling substrate according to an embodiment of the present invention.

Step S11: preparing a chitosan solution including chitosan $((C_6H_{11}O_4N)_n)$ and a solvent. Chitosan is the product after chitin is deacetylated. There is a strong correlation of the solubility of chitosan and the characteristics of the chitosan solution with the degree of deacetylation. That is, the higher the degree of deacetylation is, the more obvious the biological property is and the higher the solubility is. Therefore, the degree of deacetylation of the chitosan of the present invention may be higher than 65% or preferably higher than 70%, and the pH-value of the chitosan solution may be less than 7 to enhance the solubility.

The solvent may include water, C1-C4 alcohols, organic acids, inorganic acids or a combination thereof. The organic acids may include acetic acid, and the inorganic acids may include hydrochloric acid. The solvent may include water and ethyl alcohol with a volume ratio less than 2:8. The ratio of weight of the chitosan and volume of the solvent is 0.01 g: 1000 mL to 20 g: 1000 mL to 20:1000 mL.

Step S12: providing a metallic substrate into an electrophoresis cell loaded with the chitosan solution. The metallic substrate may be a stainless steel substrate, a platinum substrate, or substrates of any kind suitable for the electrophoretic deposition process. Further, the metallic substrate may be a single-layer structure or a multi-layer structure. The metallic substrate may include any substrate having a metal layer disposed on the surface thereof. The process used to dispose the metal layer may be an evaporation deposition process or any equivalent process well known by a person skilled in the art. The metallic substrate may include a silicon substrate, a metal layer and an adhesive layer disposed between the silicon substrate and the metal layer in order to enhance the adhesive force there between. The process used to dispose the adhesive layer may be an evaporation deposition process or any equivalent process well known by a person skilled in the art. The adhesive layer may include chromium (Cr) or titanium (Ti) and the thickness thereof may be 10 nm to 50 nm.

Step S13: applying a voltage to the metallic substrate for a predetermined time period to process the electrophoretic deposition. The voltage may be less than 30V and the predetermined time period may be less than five minutes. When the predetermined time period is more than five minutes, the thickness of the chitosan layer is excess and causes an undesired effect of thermal energy absorption.

Steps S14: depositing a chitosan layer with a first thickness on the metallic substrate in an electrophoretic process taking the chitosan solution as the electrophoresis buffer and S15: obtaining the radiative cooling substrate. The chitosan layer may emit radiation within a waveband between 8 μm and 13 μm. The first thickness may be 0.5 μm to 10 μm. When the first thickness is less than 0.5 μm, the chitosan layer may not radiatively dissipate thermal energy. When the first thickness is more than 10 μm, the chitosan layer may absorb excess thermal energy. Further, the thickness of the deposited chitosan layer should not lead to a significant reduction (>0.15) in reflectance.

The present invention will be described in detail in embodiments below.

Figure 2:
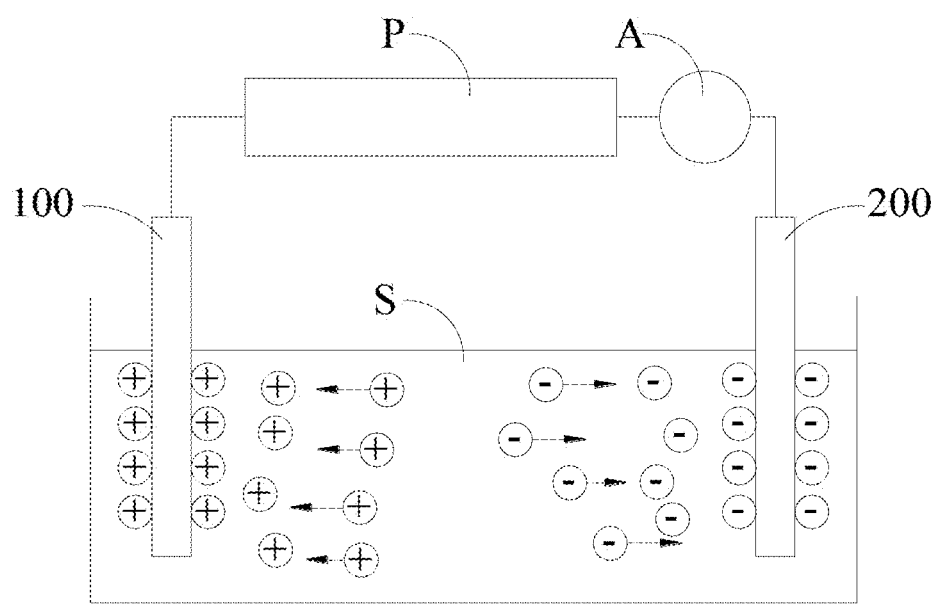
FIG. 2 depicts an experimental configuration of the radiative cooling substrate according to an embodiment of the present invention.

Refer to FIG. 2, which depicts an experimental configuration of the radiative cooling substrate according to an embodiment of the present invention.

As shown in FIG. 2, the DC power supply P is configured to provide a stable voltage and is connected to the galvanometer A in a serial circuit to measure the current versus time curve. The anode 200 and the cathode 100 are disposed in the chitosan solution to provide electric field therein, which makes ions of the chitosan solution S move. When the cathode 100 obtains electrons, the electrons combine with hydrogen ions of the chitosan solution S and hence hydrogen is produced. The pH-value of the chitosan solution S near the surface of the cathode 100 increases due to the reduction of concentration of the hydrogen ions. When the pH-value increases to about 6 to 6.5 (weakly acidic), chitosan of the chitosan solution S only dissolving in acid solutions deposits on the cathode 100.

The metallic substrate mentioned above is now selected to be a 5 cm×2 cm metallic substrate. The degree of deacetylation of the chitosan is now selected to be 75% to 85%, and the molecular weight of the chitosan (purchased at Sigma-Aldrich) is 190000 g/mol to 310000 g/mol. Hydrochloric acid and acetic acid of 1% volume percentage concentration respectively prepared by mixing deionized water with hydrochloric acid and acetic acid are selected to modify the pH-value. Further, chitosan solutions of 0.06%, 0.08%, 0.1% and 1% weight percentage concentration (g/mL) are respectively prepared as well.

Chitosan/Acetic Acid Solution and Chitosan/Hydrochloric Acid Solution

First of all, weigh chitosan powder for different concentrations and solvent volumes. For example, if the chitosan solution having a volume of 500 mL is expected, chitosan powder of 0.3 g, 0.4 g, 0.5 g and 5 g are respectively supplied into hydrochloric acid or acetic acid of 1% volume percentage concentration with a volume of 500 mL for the chitosan solutions of 0.06%, 0.08%, 0.1% and 1% weight percentage concentration (g/mL). Each of the chitosan solutions is then stirred for 24 hours on a magnetic stirrer to make sure that the chitosan powder is completely dissolved. It is noted that when the chitosan powder contacts the acid solution, surface of the chitosan powder is dissolved in the beginning and forms a jelly-like substance. The jelly-like substance then becomes an obstacle to dissolving the inner portion of the chitosan powder. In this case, the time period for stirring the chitosan solution needs to be increased in case the chitosan powder is not dissolved completely.

Chitosan/Acetic Acid/Ethyl Alcohol Solution

When a water-based solvent is used in an electrophoretic deposition process, water is dissociated and produces hydrogen and oxygen on the cathode and anode respectively. Therefore, when the voltage applied in the water-based solvent is higher than 1.229V, water is dissociated and produces gas affecting the uniformity and consistency of the deposited thin film. For this purpose, ethyl alcohol is selected to replace a portion of the deionized water in the solvent. In comparison with some complicate methods such as applying impulse current or voltage, the foregoing replacement reduces the amount of the deionized water in the solvent and hence reduces the probability of occurrence of the water electrolysis reaction. Therefore, in the present invention, the selected volume ratio of ethyl alcohol and water is about 8:2, the volume of ethyl alcohol is 400 mL and the concentration of ethyl alcohol is 95%. The total volume of the deionized water and hydrochloric acids or acetic acids is 100 mL. The weight percentage concentration of the chitosan is 0.06% and the volume percentage concentration of the acetic acids is 1%.

First, weigh 0.3 g chitosan and supply the 0.3 g chitosan into an acetic acid solution of 1% volume percentage concentration with a volume of 100 mL. Stir the chitosan/acetic acid solution for 24 hours on a magnetic stirrer to make sure that the chitosan powder is completely dissolved. Then, mix the chitosan/acetic acid solution with alcohol of 400 mL, stir the chitosan/acetic acid/alcohol solution completely, and remove air dissolved therein by putting the final solution in a supersonic oscillator for 15 minutes.

Selection of Metallic Substrate

In the electrophoretic deposition process, in order not to cause a reaction of the surface of the metallic substrate and the weakly acidic chitosan solution that affects properties of the radiative cooling substrate, the selected metallic substrate disposed as the electrode should be an anti-corrosion material. Further, in order not to produce oxides or defects which affect measurement results of the radiative cooling properties, oxidation reactions over time are disliked. In addition, the metallic substrate should have high reflectance to prevent excess absorption of solar radiation worsening the radiative cooling performance.

A substrate made of the 304 stainless steel with a thickness of 0.3 mm and a bright surface is selected. In this case, the flat and smooth surface of the substrate benefits the uniformity of the deposited thin film and reduces interference effects. In addition, platinum is also selected as the material of the substrate since it is chemically stable and widely used. However, platinum bulk is too expensive. In the practical implementation, the so-called platinum substrate is a silicon substrate with a platinum layer deposited thereon via an evaporation deposition process. Here, it is necessary to decide the thickness of the deposited platinum layer before the evaporation deposition process in order to not affect the sequential measurements of radiative properties. The result is shown in FIG. 3.

Figure 3:
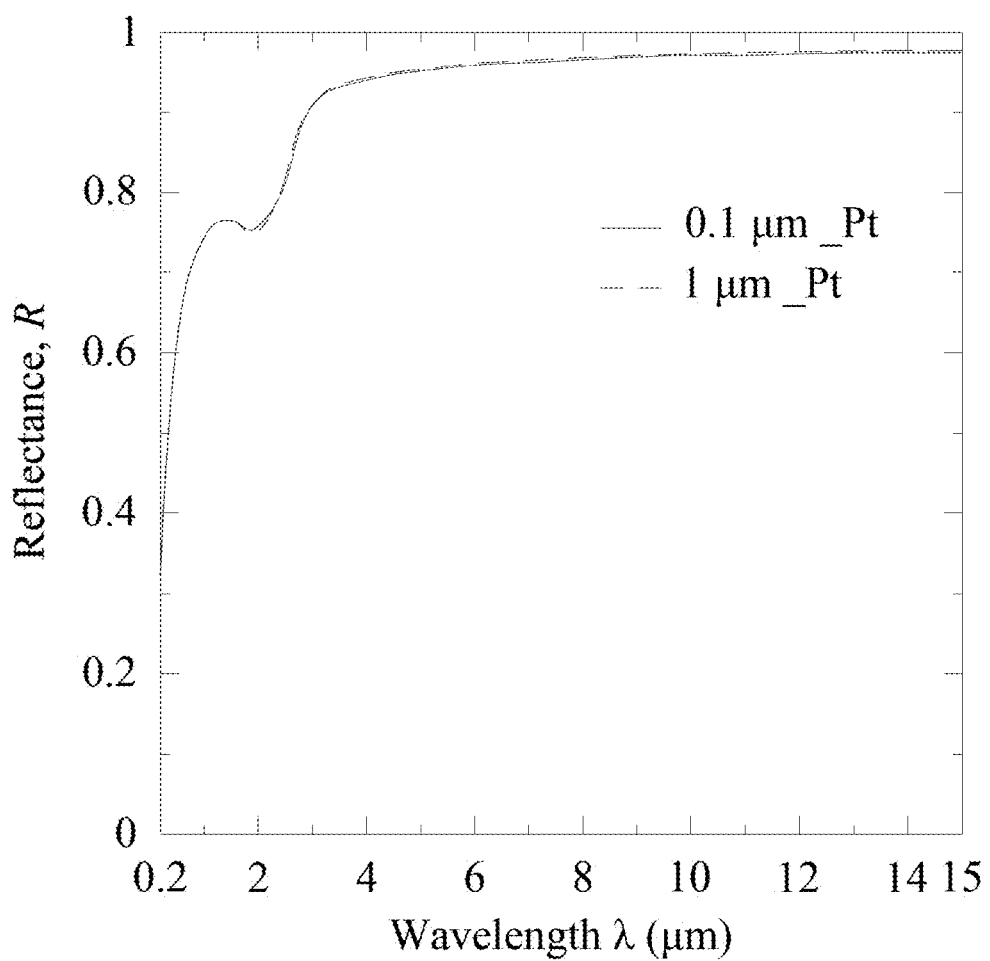
FIG. 3 depicts the reflectance of a radiative cooling substrate with a platinum substrate according to an embodiment of the present invention.

Refer to FIG. 3, which depicts the reflectance of a radiative cooling substrate with a platinum substrate according to an embodiment of the present invention. As shown in FIG. 3, the transmittance of a substrate having a platinum layer with a thickness of 0.1 μm and or the transmittance of a substrate having a platinum layer with a thickness of 1 μm are both approximately zero. That is, no light can penetrate. Therefore, a silicon substrate with a platinum layer having a thickness of 0.12 μm deposited thereon is taken as the metallic substrate for cost down. Further, a chromium layer having a thickness of 0.02 μm is used as the adhesive layer to enhance the adhesive force between the platinum layer and the silicon substrate.

Electrophoretic Deposition Process

Refer to Table 1. Substrates having different materials, various kinds of chitosan solutions, different predetermined time period and different voltages are shown in Table 1 for manufacturing the Samples 1-17.

TABLE 1

| Sample number | Metallic substrate | Chitosan solution | | Predetermined | |
|---|---|---|---|---|---|
| | | Kinds | concentration | time period | Voltage |
| 1 | Stainless steel | Chitosan/hydrochloric acids solution | 1% | 5 min | 5 V |
| 2 | Stainless steel | Chitosan/hydrochloric acids solution | 1% | 5 min | 4 V |
| 3 | Stainless steel | Chitosan/hydrochloric acids solution | 1% | 5 min | 3 V |
| 4 | Stainless steel | Chitosan/hydrochloric acids solution | 1% | 5 min | 1 V |
| 5 | Platinum | Chitosan/hydrochloric acids solution | 1% | 5 min | 4 V |
| 6 | Stainless steel | Chitosan/acetic acids solution | 1% | 5 min | 4 V |
| 7 | Stainless steel | Chitosan/acetic acids/ethyl alcohol solution | 0.06% | 1 min | 25 V |
| 8 | Platinum | Chitosan/acetic acids/ethyl alcohol solution | 0.06% | 5 min | 25 V |
| 9 | Stainless steel | Chitosan/acetic acids/ethyl alcohol solution | 0.06% | 1 min | 25 V |
| 10 | Stainless steel | Chitosan/acetic acids/ethyl alcohol solution | 0.06% | 3 min | 25 V |
| 11 | Stainless steel | Chitosan/acetic acids/ethyl alcohol solution | 0.06% | 5 min | 25 V |
| 12 | Stainless steel | Chitosan/acetic acids/ethyl alcohol solution | 0.06% | 30 s | 25 V |
| 13 | Stainless steel | Chitosan/acetic acids/ethyl alcohol solution | 0.06% | 45 s | 25 V |
| 14 | Stainless steel | Chitosan/acetic acids/ethyl alcohol solution | 0.06% | 60 s | 25 V |
| 15 | Platinum | Chitosan/acetic acids/ethyl alcohol solution | 0.06% | 30 s | 25 V |
| 16 | Platinum | Chitosan/acetic acids/ethyl alcohol solution | 0.06% | 46 s | 25 V |
| 17 | Platinum | Chitosan/acetic acids/ethyl alcohol solution | 0.06% | 60 s | 25 V |

Figure 4:
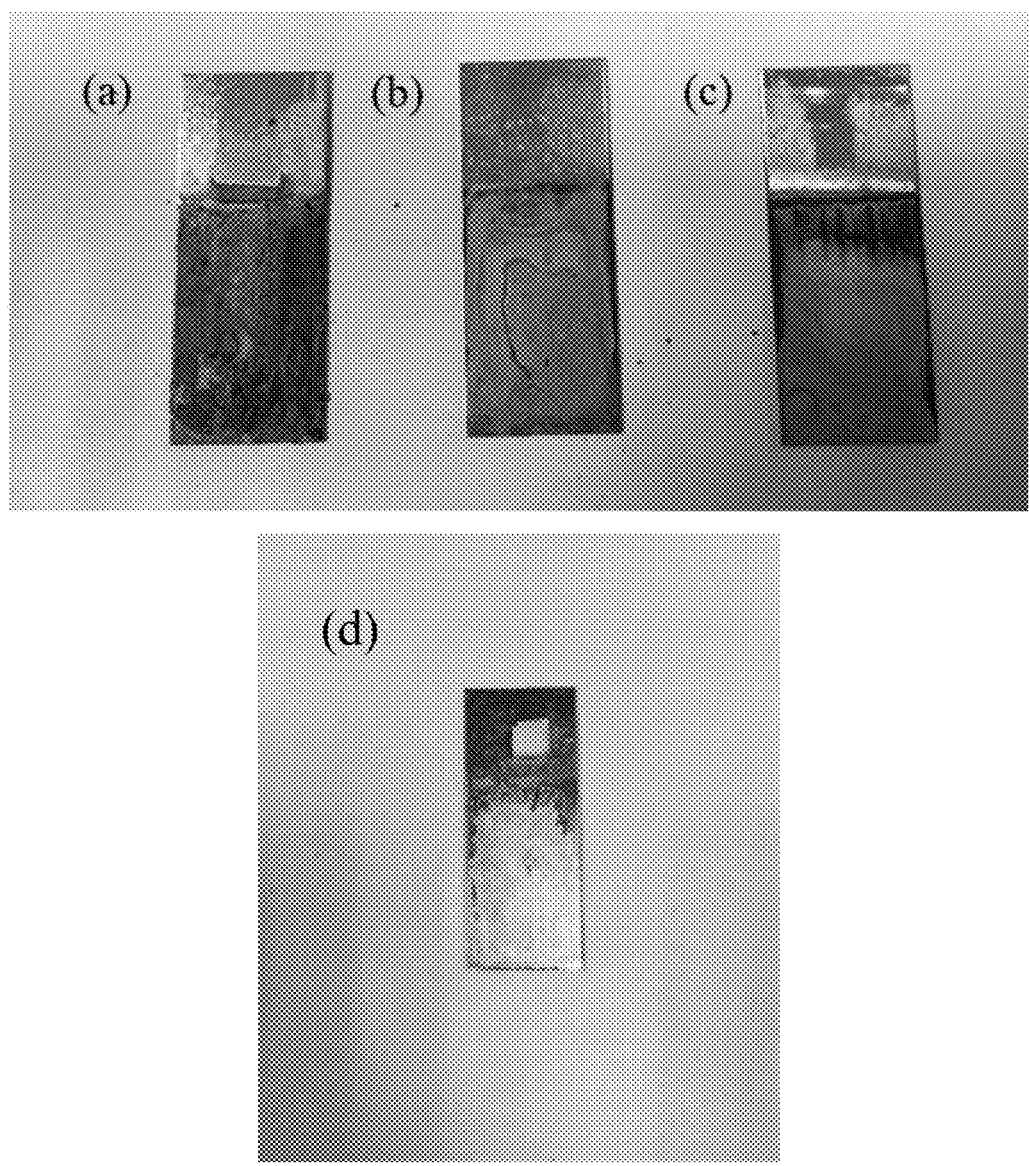
FIGS. 4-8 show pictures of the radiative cooling substrate samples of the present invention.

Refer to FIG. 4, which shows pictures of the radiative cooling substrate samples of the present invention. Parts (a) to (d) of FIG. 4 represent Samples 1 to 4 respectively. As shown in parts (a) to (c) of FIG. 4, the brown substance is oxides, which indicates substantial oxidation occurrences on the stainless steel substrate. The oxides thereon might lead to more absorption of radiative energy and worsen the radiative cooling performance. Furthermore, in comparison with part (d) of FIG. 4, more bubbles are generated in the deposition process such that it is difficult for the deposited chitosan (the white substance shown in part (d) of FIG. 4) to attach to the substrates. Refer to part (d) of FIG. 4. After the voltage is set to be 1 V, there is no serious corrosion situation on the substrate and chitosan is successfully deposited on the stainless steel substrate. However, the deposited chitosan is not uniformly distributed and the surface of the chitosan layer is very rough.

Figure 5:
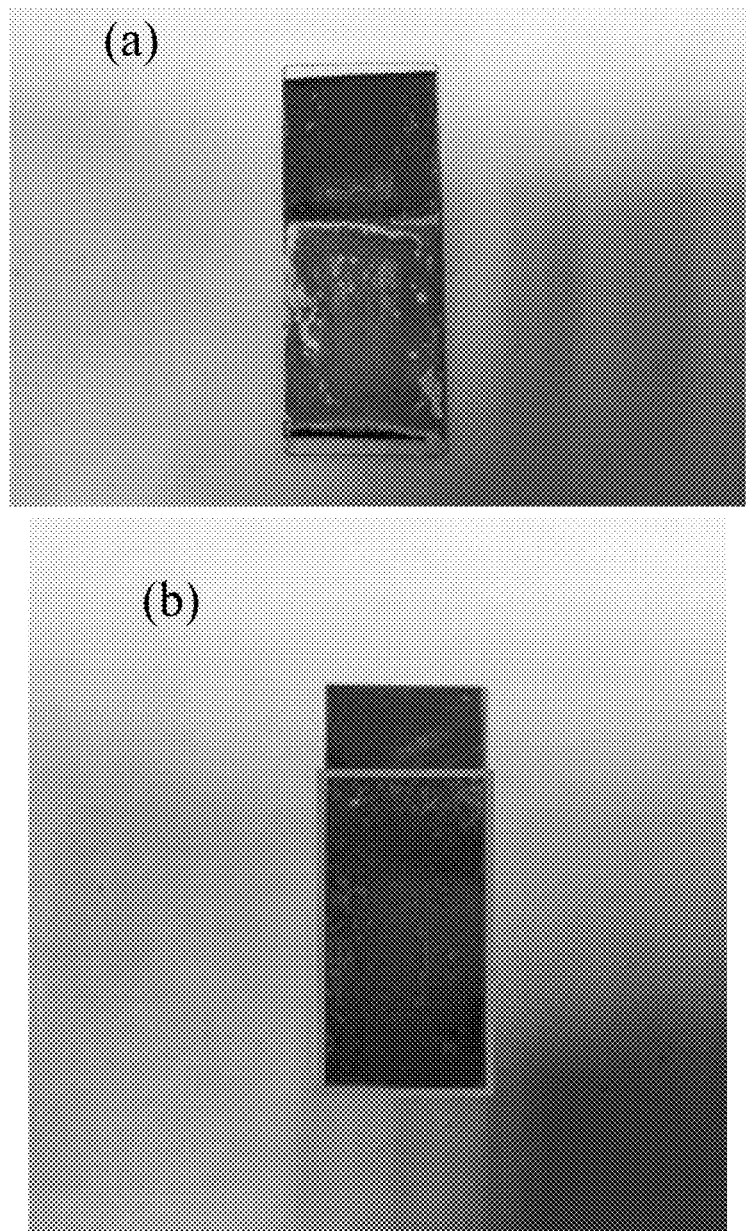

Refer to FIG. 5, which shows pictures of the radiative cooling substrate samples of the present invention. Parts (a) and (b) of FIG. 5 represent Samples 5 and 6 respectively. As shown in part (a) of FIG. 5, the deposited chitosan is not uniformly distributed as well. Possible reasons for the non-uniformity are as followings: (1) the concentration of the chitosan solution is too high, which leads to a high deposition rate; (2) when hydrochloric acid is used as the acid solution, the rate of reaction is high and numerous bubbles are generated such that it is difficult for the deposited chitosan to attach to the substrates.

As shown in part (b) of FIG. 5, in comparison with the foregoing situation where chitosan/hydrochloric acids solution is used, the deposited chitosan is more uniformly distributed in the chitosan/acetic acids solution. The rate of reaction of the electrophoretic deposition process is relatively lower, and the thickness of the chitosan layer obviously reduces. However, the surface of the chitosan layer is rough as well. Further, since the viscosity of the chitosan/acetic acids solution with 1% weight percentage concentration is higher, some residual chitosan/acetic acids solution is hence on the surface of the sample, which makes the surface of the sample become rougher. Chitosan undergo a deprotonation process generates hydrogen, which leads to traces of bubbles in the chitosan layer. There are not brown oxides on the stainless steel substrate when making use of the chitosan/acetic acids solution for the electrophoretic deposition process.

In addition to replacing the deionized water by ethyl alcohol and hence reducing the probability of occurrence of the water electrolysis reaction, reduction of the current density benefits the uniformity of the deposited chitosan layer. Consequently, the applied currents of the present invention are controlled to be less than 0.5 mA.

Figure 6:
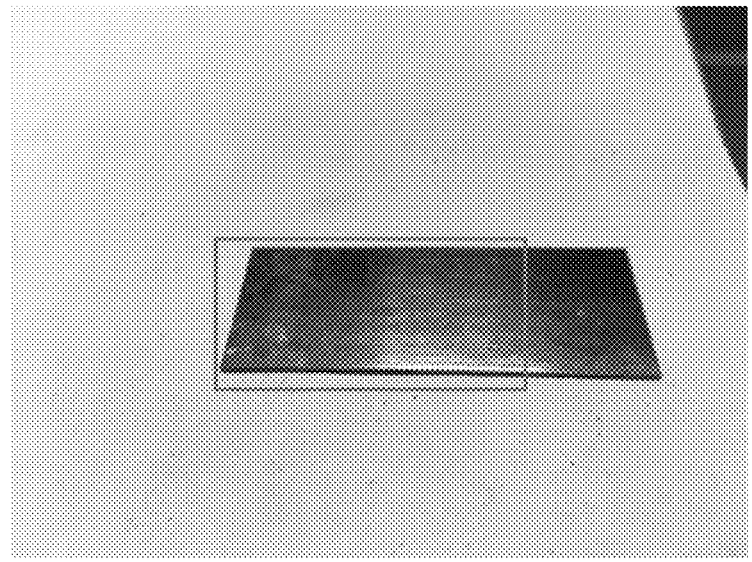

Refer to FIG. 6, which shows a picture of a radiative cooling substrate sample of the present invention. FIG. 6 represents the Sample 7. As shown in FIG. 6, a white chitosan layer is visible on the stainless steel substrate and the uniformity thereof is obviously improved. Besides, there is not significant generation of bubbles in the deposition process. The addition of ethyl alcohol is proved effective for inhibiting the water electrolysis reaction in the deposition process.

Figure 7:
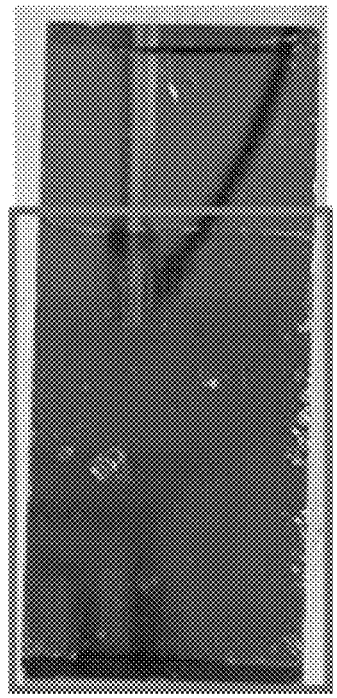

Refer to FIG. 7, which shows a picture of a radiative cooling substrate sample of the present invention. FIG. 7 represents the Sample 8. As shown in FIG. 7, due to the longer predetermined time period, some traces of bubbles appear, yet the number of bubbles is less than that of the condition where no ethyl alcohol are added.

Figure 8:
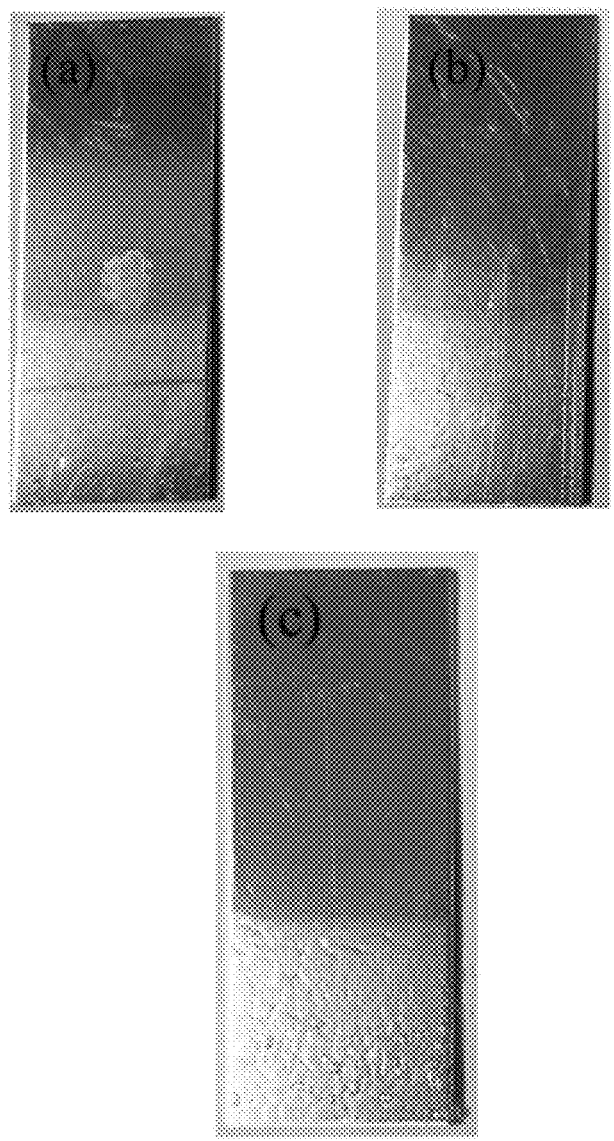

Refer to FIG. 8, which shows pictures of the radiative cooling substrate samples of the present invention. Parts (a) to (c) of FIG. 8 represent Samples 9 to 11 respectively. As shown in part (c) of FIG. 8, since the concentrations of the samples increase, traces of bubbles become obvious. As shown in part (b) of FIG. 8, the longer the predetermined time period is, the more the bubbles are. Uniformity thereon gets worse. As shown in part (a) of FIG. 8, the uniformity of the Sample 9 is better.

Cross-Cut Adhesion Test

Here, the Samples 6 and 7 are taken to undergo a cross-cut adhesion test. In the test, Use a cross-cut tester or a normal cutter to evenly draw fixed-size squares on the samples to be tested. The test tape of No. 600 or No. 601 produced by the 3M Company is firmly adhered to the sample. The test tape is then quickly pulled off in direction perpendicular to the test surface. Proceed the foregoing process for the same position of the sample twice and make a visual check whether or not the test tapes are clean and remaining transparent. The result is shown in FIG. 9.

Figure 9:
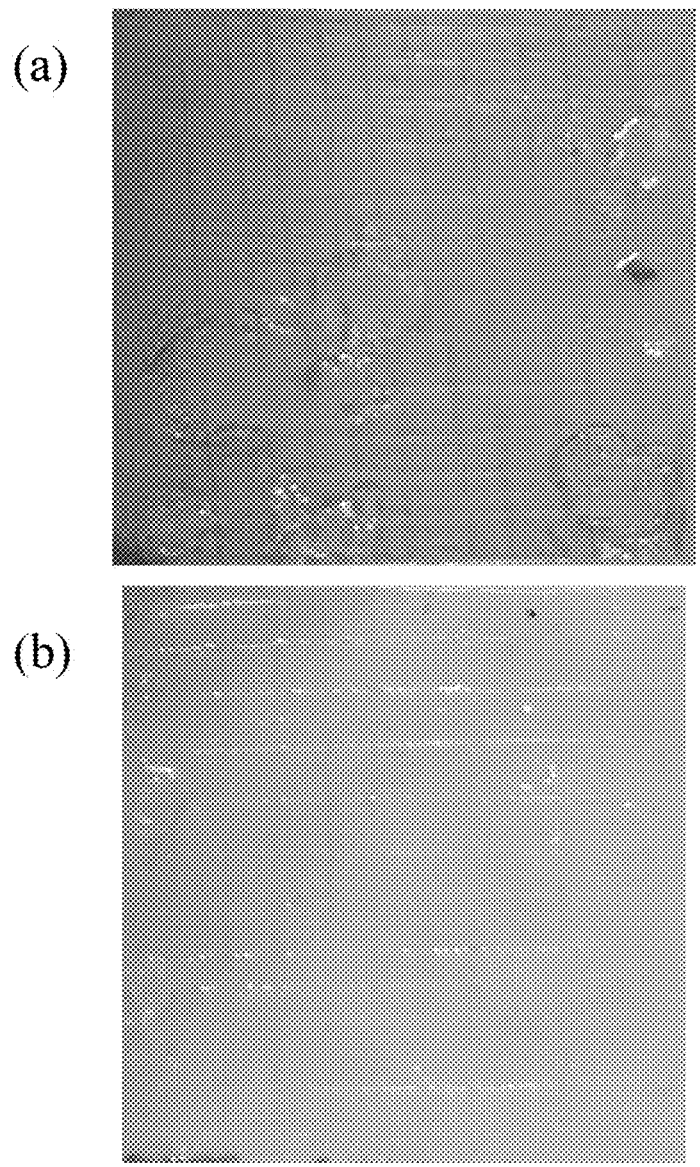
FIG. 9 shows the result of the cross-cut adhesion test of a radiative cooling substrate of the present invention.

Refer to FIG. 9, which shows the result of the cross-cut adhesion test of a radiative cooling substrate of the present invention. Parts (a) and (c) of FIG. 9 represent Samples 6 and 7 respectively. As shown in part (a) of FIG. 9, about 50% of the chitosan layer peels off. That is, before adding ethyl alcohol into the solution, bubbles generated in the electrophoretic deposition process by using the chitosan/acetic acids solution reduce the adhesive force between the chitosan layer and the stainless steel substrate. As shown in part (b) of FIG. 9, after adding ethyl alcohol, the number of bubbles decreases and the adhesive force significantly increases.

Analysis of Ellipsometry

An ellipsometry is used in the present invention for measuring the refractive index (n) and the extinction coefficient (Kc) of the metallic substrate. The result is shown in FIG. 10.

Figure 10:
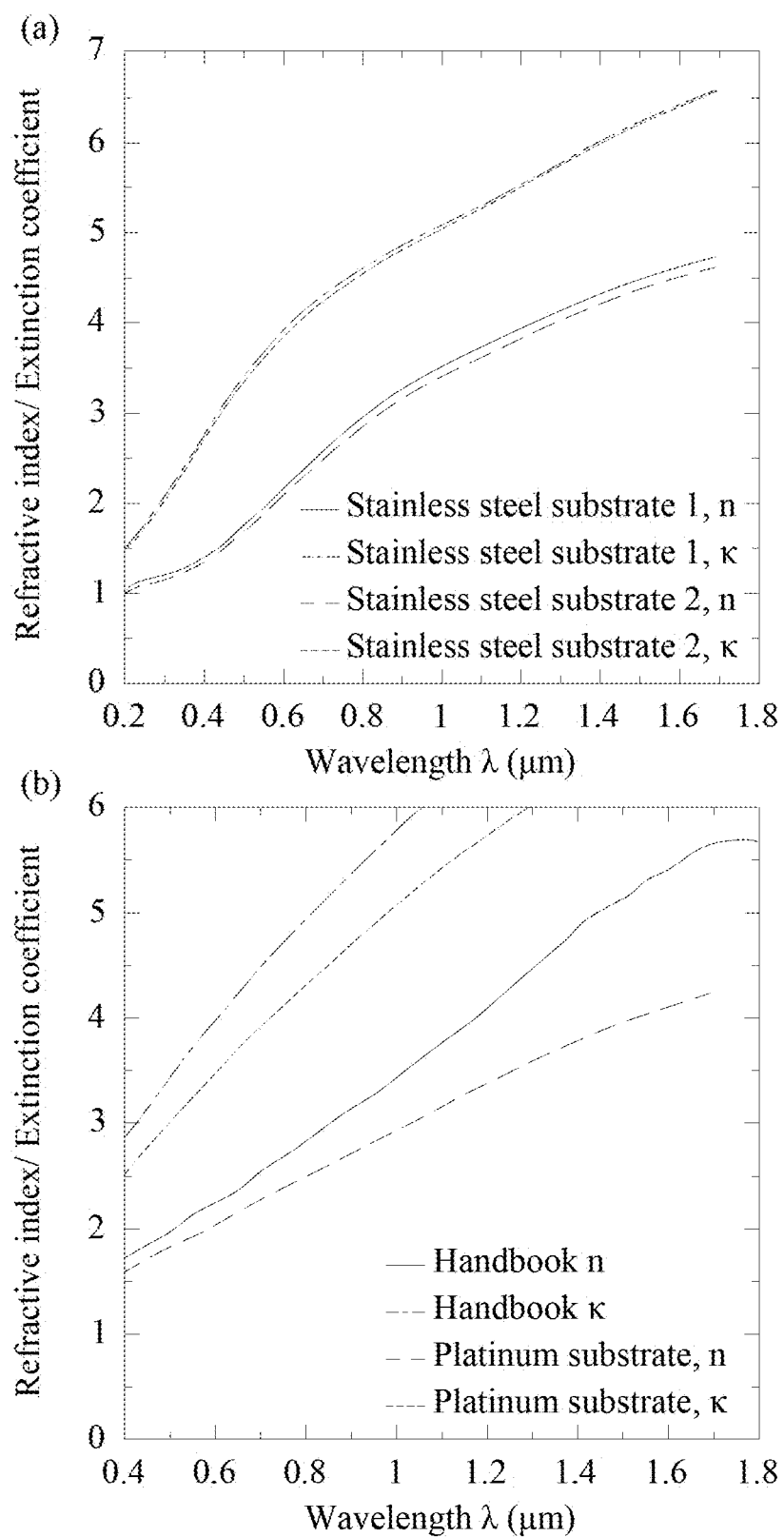
FIG. 10 depicts the analysis result of the ellipsometer of a radiative cooling substrate of the present invention.

Refer to FIG. 10, which depicts the analysis result of the ellipsometer of a radiative cooling substrate of the present invention. Parts (a) and (c) of FIG. 10 represent the stainless steel substrate and the platinum substrate respectively. As shown in part (a) of FIG. 10, optionally choose two stainless steel substrates (denoted as the stainless steel substrate 1 and the stainless steel substrate 2) and confirm that the optical properties of the two stainless steel substrates are substantially the same. As shown in part (b) of FIG. 10, the refractive index (n) and the extinction coefficient (u) of the platinum substrate are measured and compared to that recorded in handbook of optical constants of solids. The result shown in part (b) of FIG. 10 tells difference between the platinum substrate of the present invention and the theoretical values. One of the possible reasons for the foregoing situation might be that the platinum substrate of the present invention is produced via the evaporation deposition process while the theoretical values are taken by measuring a platinum block. The compactness of the platinum substrate is lower than that of a platinum block.

After the forgoing optical coefficients are confirmed, make use of a physical model and a numerical analysis method to understand some physical properties and obtain some physical parameters of the samples. Here is the Cauchy model:

$$n(\lambda) = A + \frac{B}{\lambda^2} + \frac{C}{\lambda^4}$$

$$\kappa(\lambda) = 0$$

The model is applicable to a transparent thin film, wherein the refractive index decreases while the wavelength $\lambda$ increases and the extinction coefficient is assumed to be zero. The fitting waveband is from 500 nm to 1700 nm. Each of A, B and C in the above equation is constant. Using the three known wavelengths and the corresponding refractive indexes solves the above simultaneous equations and obtains the constants A, B and C. Consequently, obtain thickness of respective samples (Samples 12-17) by making use of the ellipsometry and make sure the reproducibility by testing repeatedly. The result is shown in Table 2.

TABLE 2

| Sample number | Thickness of thin film (nm)/Repeat times | | | | |
|---|---|---|---|---|---|
| | 1 | 2 | 3 | 4 | 5 |
| 12 | 415.3 | 415.3 | 418.6 | 416.9 | 407.5 |
| 13 | 604.3 | 605.3 | 591.3 | 582.8 | 599.9 |
| 14 | 732.2 | 716.14 | 698.7 | 705.8 | 698.5 |
| 15 | 357.4 | 351.5 | 340.6 | N.A. | N.A. |
| 16 | 437.4 | 397.8 | 541.5 | N.A. | N.A. |
| 17 | 715.5 | 692.0 | 728.0 | N.A. | N.A. |

As shown in Table 2, the maximum relative error of the thickness measurement for different samples is about 2%~4%, which means that the model has a high credibility.

Measurement Using Surface Roughness Instrument

Since the surface roughness instrument is recommended not to measure high hardness materials so as not to damage the probe, only the platinum samples are tested. The result is shown in FIG. 11.

Figure 11:
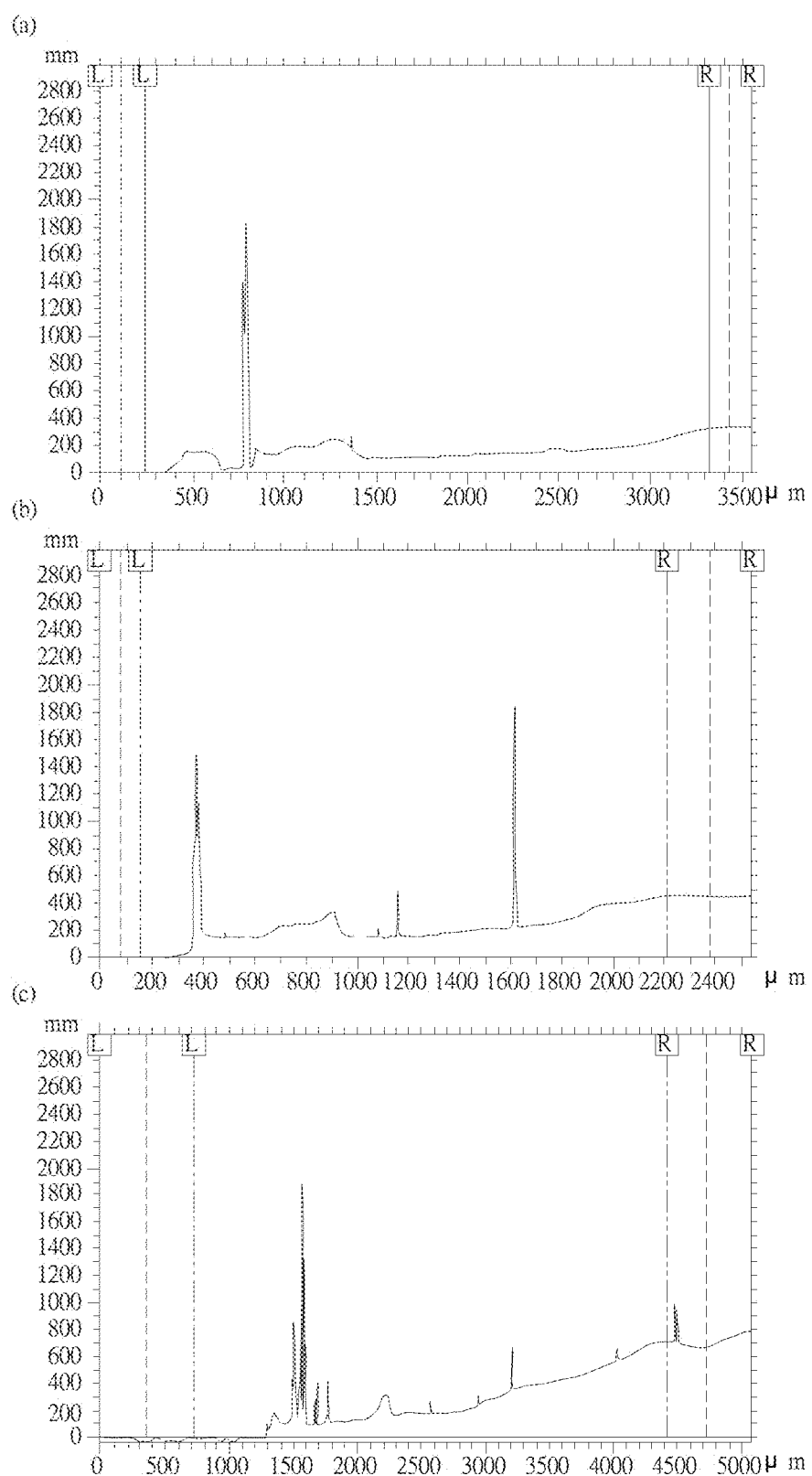
FIG. 11 depicts the analysis result of the surface roughness instrument of radiative cooling substrates of the present invention.
Figure 12:
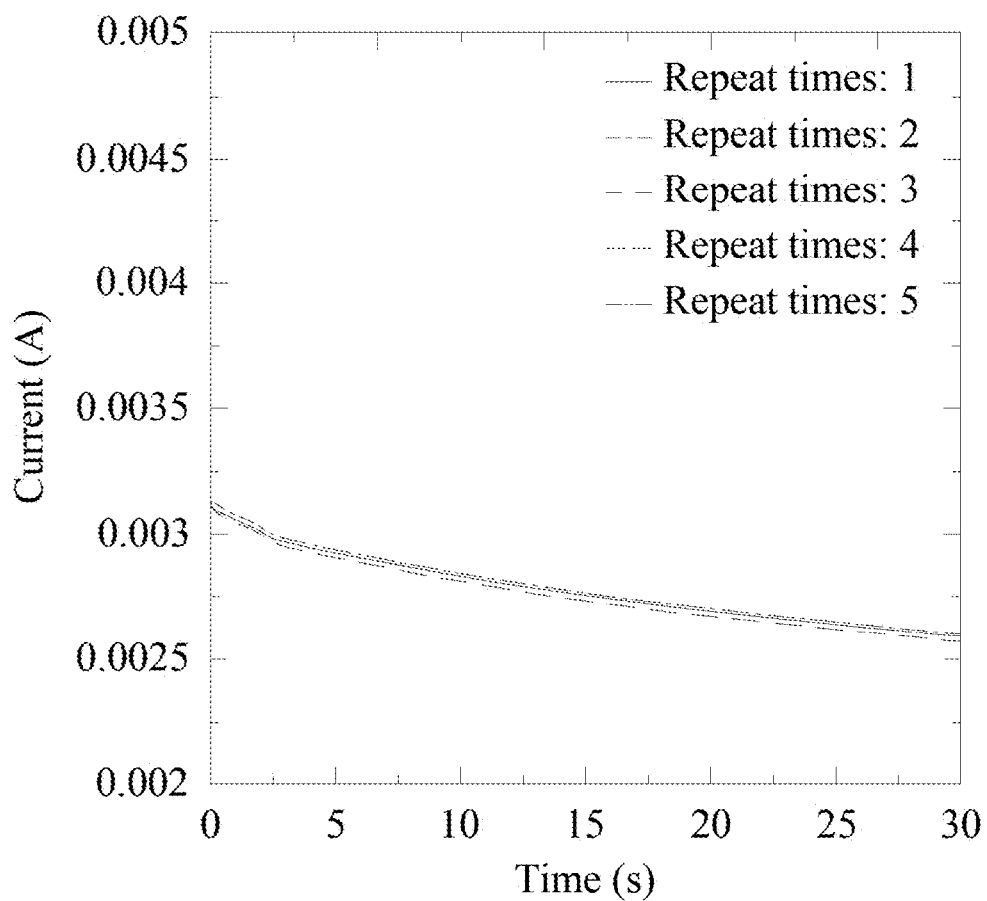
FIGS. 12-17 depict the current curves of the radiative cooling substrates of the present invention.
Figure 13:
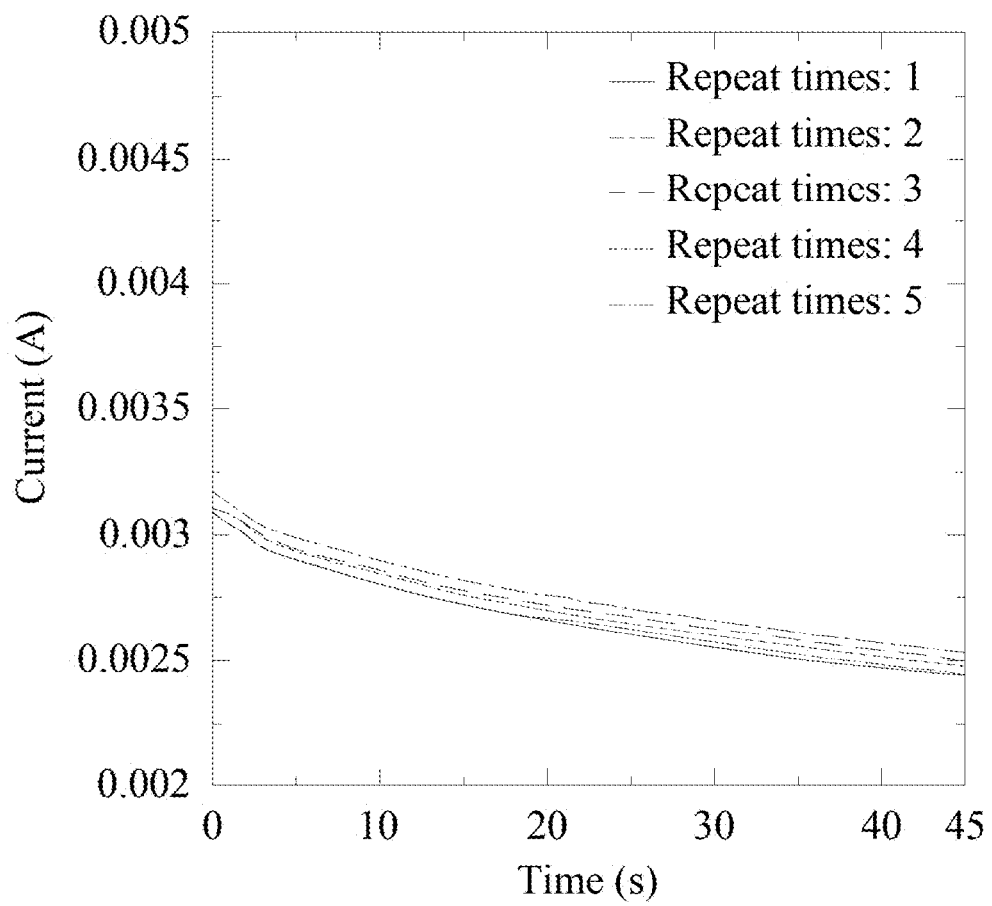
Figure 14:
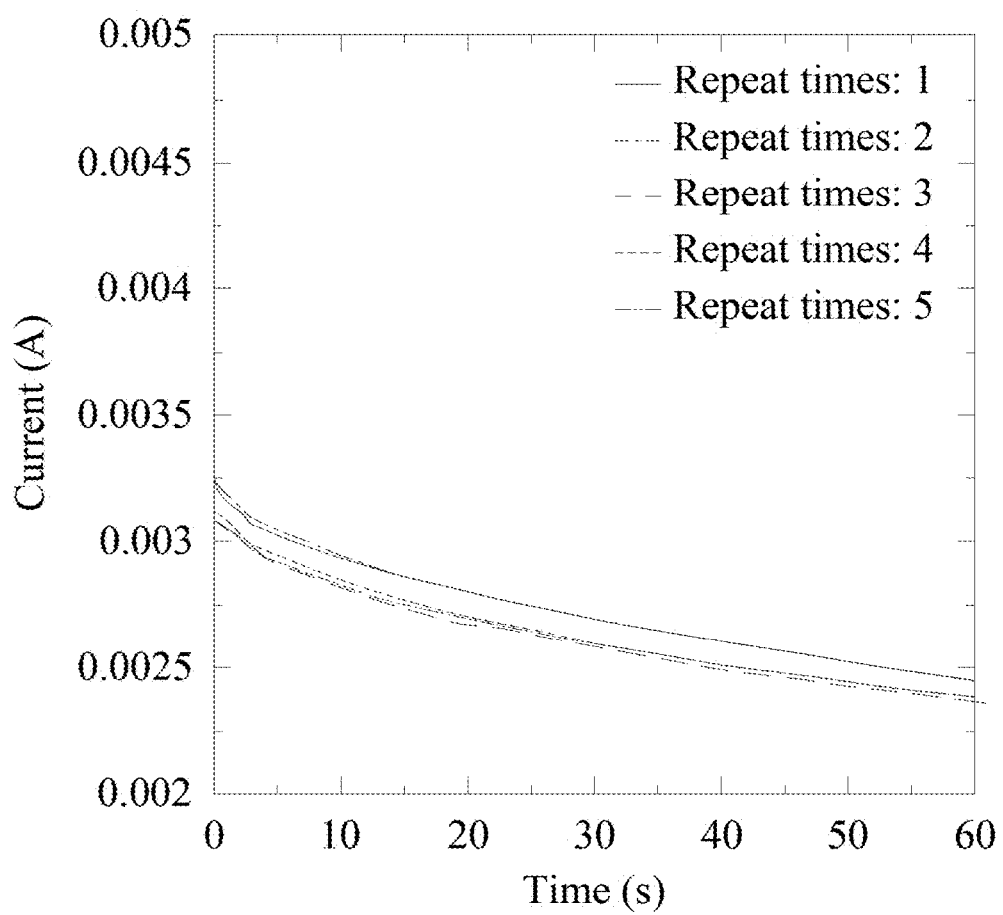
Figure 15:
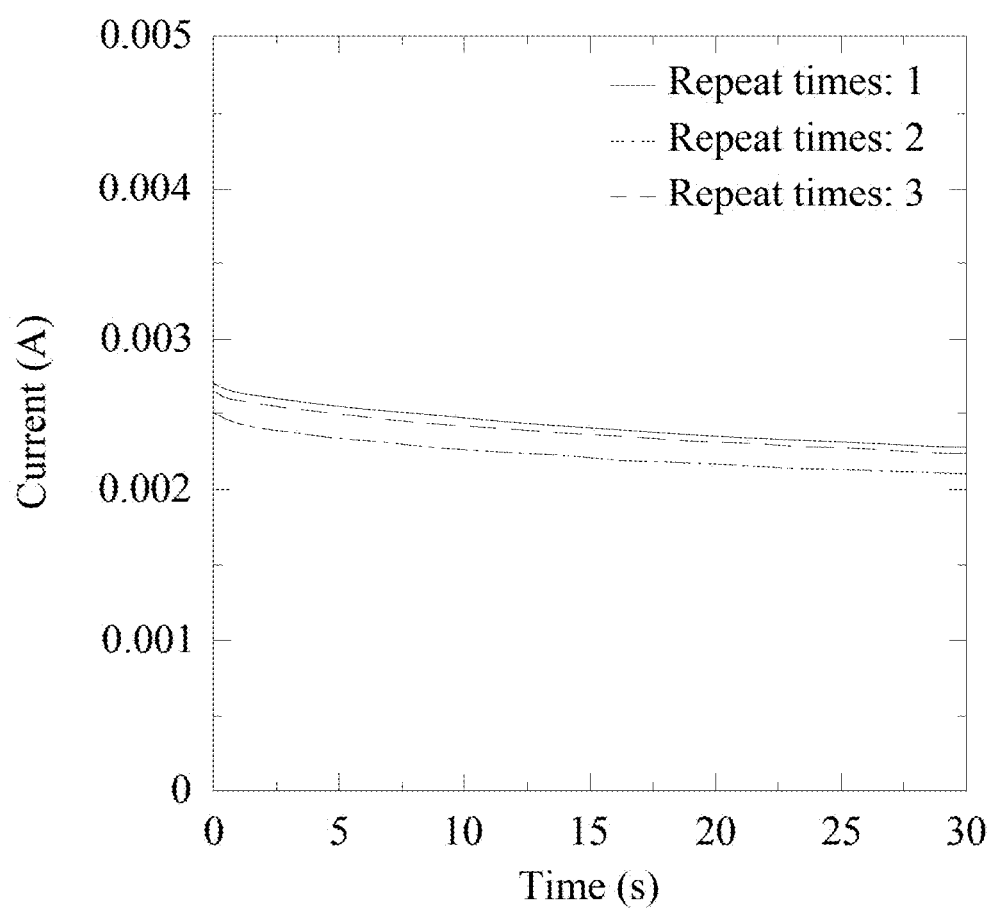
Figure 16:
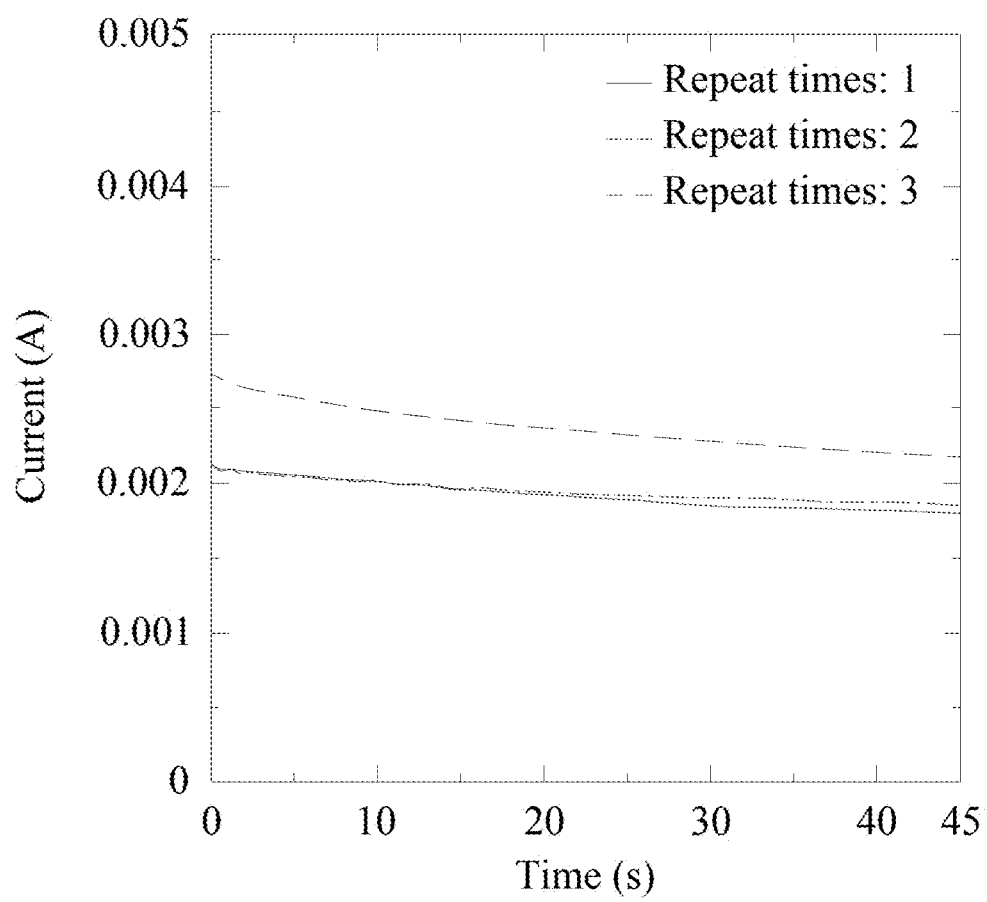
Figure 17:
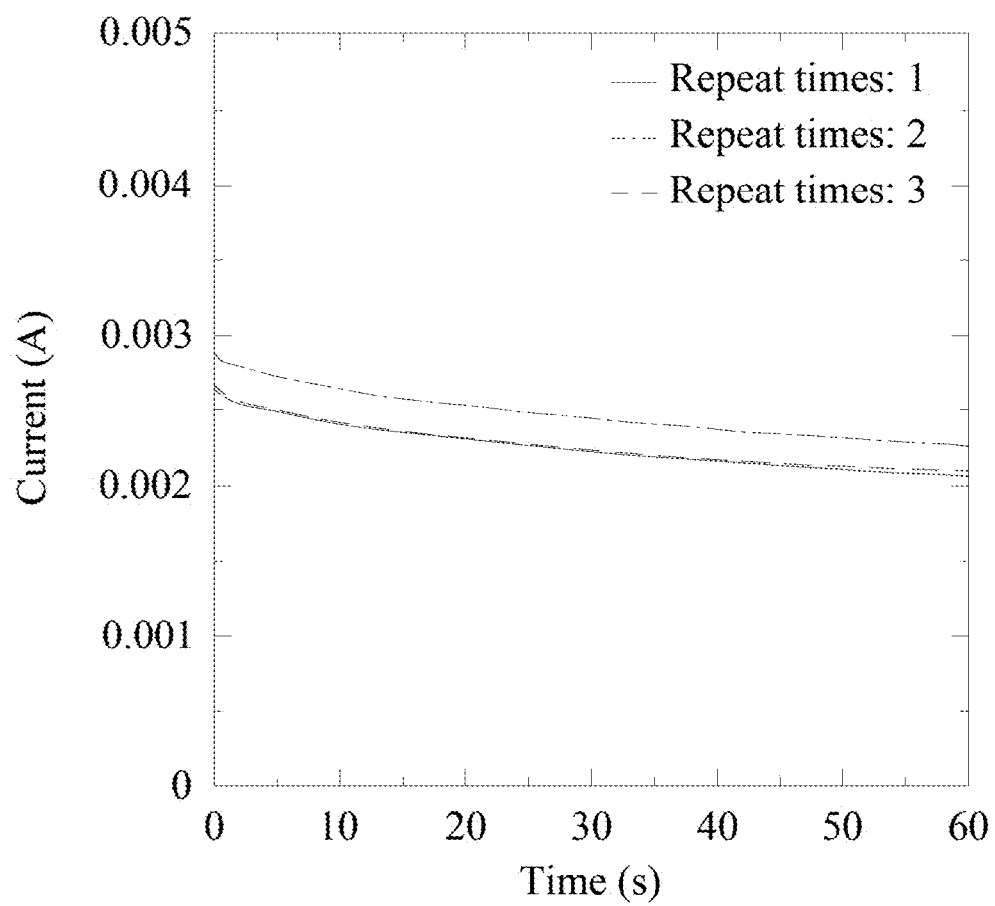

Refer to FIG. 11, which depicts the analysis result of the surface roughness instrument of radiative cooling substrates of the present invention. Parts (a) to (c) of FIG. 11 represent the Samples 15 to 17 respectively. As shown in FIG. 11, the thin film thicknesses of the Samples 15 to 17 are 329.8 nm, 454.1 nm and 726.4 nm respectively, while the measurement results of the ellipsometry are 357.4 nm for the Sample 15, 397.8 nm for the Sample 16 and 692 nm for the Sample 17, wherein the relative errors are 7.7%, 12% and 4% for the Samples 15-17 respectively. Here, the thickness is defined as the difference between the average thickness of the region R and that of the region L, which are computed by the computer. In addition, since the tested sample might have some leftover chitosan solution thereon, the measurement result of the surface roughness instrument might include the thickness of the dry chitosan solution. Therefore, the average thickness of the flatter region is taken into consideration and the thickness difference between the flatter region and the metallic substrate is regarded as the thickness of the chitosan layer. In addition, those peaks of FIG. 11 are due to the attachment of particles on the samples.

Prediction of Thin Film Thickness

Choose two electrodes and keep 1 cm distance therebetween, load the chitosan solution with a volume of 6 mL in to the electrophoresis cell having a size of 2.5 cm×1 cm×4.5 cm. Calculate the area of the current-time curve, make use of the linear least squares method and use the measurement result of the ellipsometry to predict the thickness of the deposited chitosan layer. Record current values with a 25 ms interval and repeat five times each time. The results are shown in FIGS. 12-17.

Refer to FIGS. 12-17, which depict the current curves of the radiative cooling substrates of the present invention. FIGS. 12-17 represent the Samples 12-17 respectively. The areas under the current-time curves are calculated according to the rectangle rule and shown in Table 3.

TABLE 3

| Sample number | Area under the current-time curve (Q)/Repeat times | | | | |
|---|---|---|---|---|---|
| | 1 | 2 | 3 | 4 | 5 |
| 12 | 0.085 | 0.085 | 0.085 | 0.085 | 0.084 |
| 13 | 0.121 | 0.126 | 0.124 | 0.123 | 0.122 |
| 14 | 0.165 | 0.165 | 0.159 | 0.160 | 0.159 |
| 15 | 0.074 | 0.068 | 0.073 | N.A. | N.A. |
| 16 | 0.087 | 0.089 | 0.108 | N.A. | N.A. |
| 17 | 0.136238 | 0.149095 | 0.137253 | N.A. | N.A. |

As shown in Table 3, for the Samples 12-14 with the same deposition time, the maximum error of the area under the current-time curve is merely 3%, which indicates that the deposition process has reproducibility. Further, make use of a regression model to obtain the relation between the total coulomb and the thickness and take the constant term as zero, wherein the y-axis represents the thickness (nm) and the x-axis represents the total coulomb (C). The linear regression equation is y=4609.2x and $R^2$=0.997. The probability value of the variance analysis is $2.09 \times 10^{-18}$. For the Samples 15-17, the maximum errors of the area of the current-time curve are 7%, 19% and 7% respectively. The equation is y=4968.4x and $R^2$=0.9608. The probability value is $4.14 \times 10^{-10}$. Since $R^2$ approximates to one, the linear regression model significantly matches the experimental result and is an effective method for predicting the thickness.

Measurement of Radiative Properties

Proceed the 8-degree reflectance and absorptance analysis by making use of a hemispherical radiative properties measurement system. The analysis results of a stainless steel substrate, a platinum substrate and the Samples 8 and 10 are shown in FIGS. 18-24, wherein the stainless steel substrate and the platinum substrate have not undergone the electrophoretic deposition process. Here, the absorptance is obtained according to the Kirchhoff's law.

Figure 18:
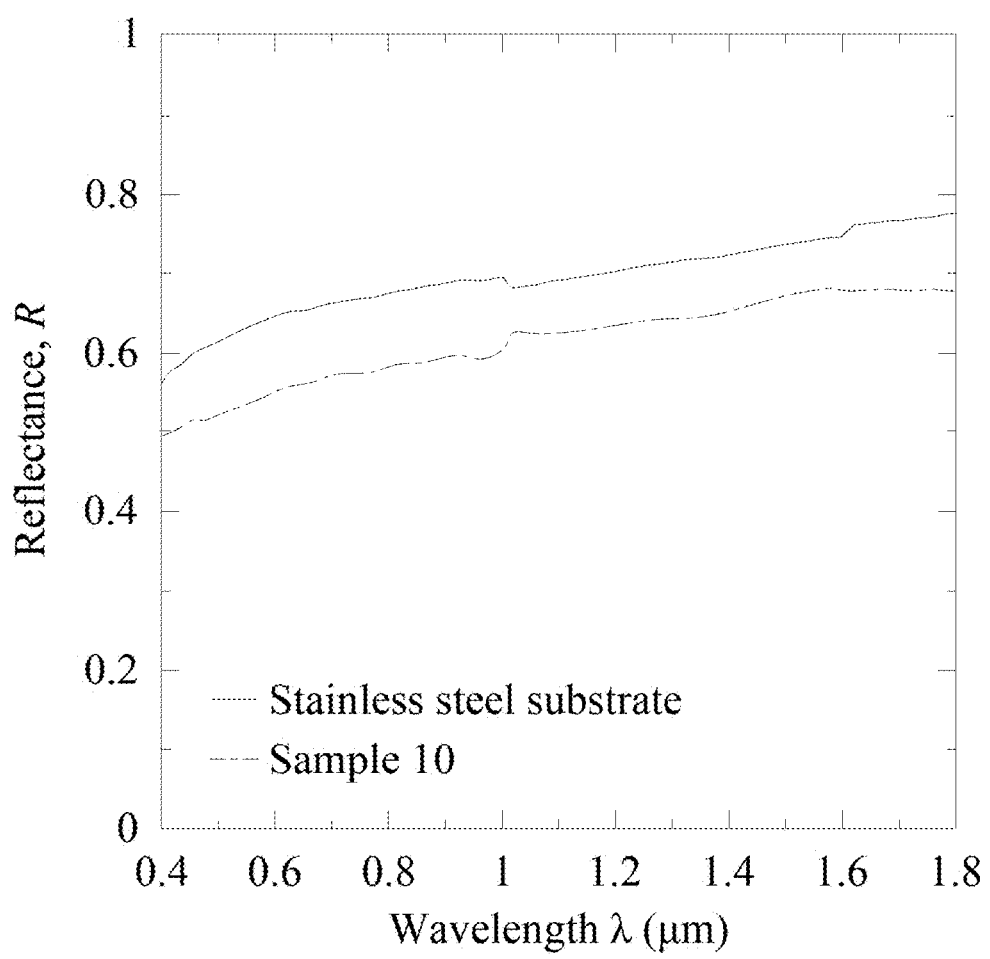
FIGS. 18-24 depict the radiative characteristics of the radiative cooling substrates of the present invention.
Figure 19:
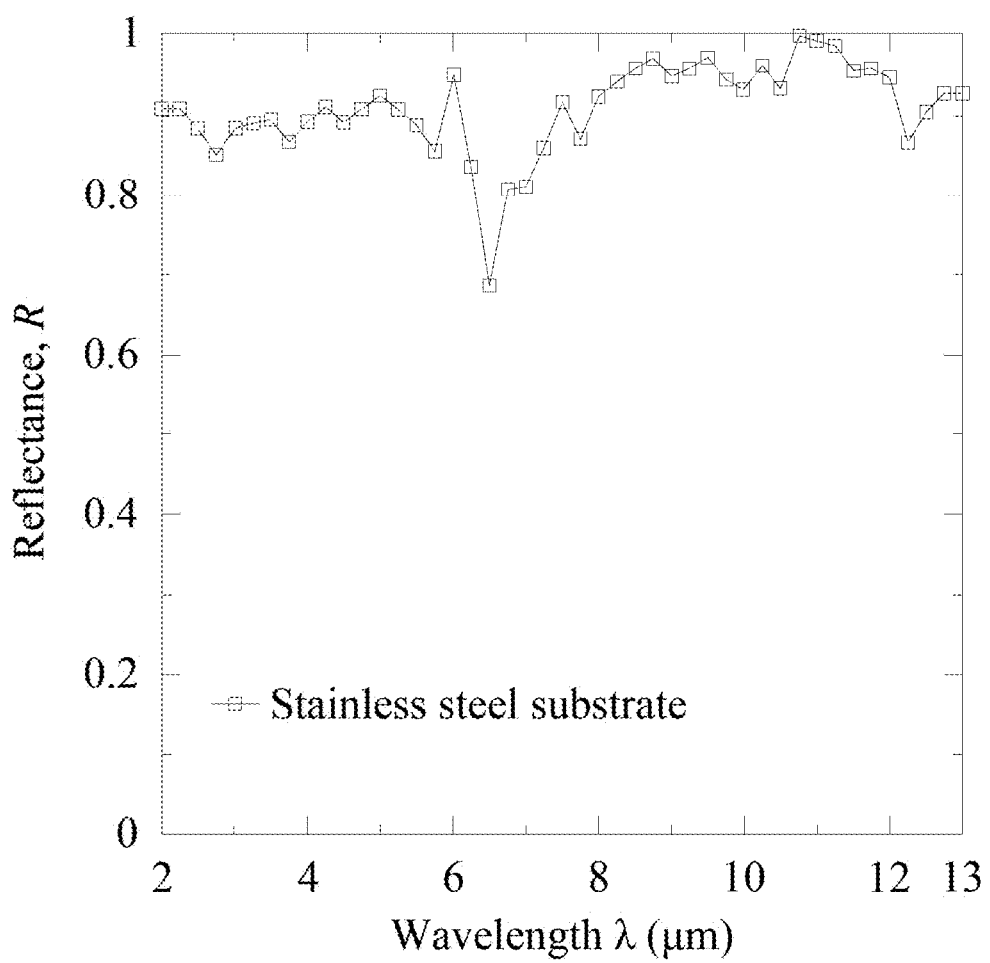

Refer to FIGS. 18-24, which depict the radiative characteristics of the radiative cooling substrates of the present invention. As shown in FIG. 18, the reflectance of the Sample 10 is lower than the substrate of the Sample 10 itself, since the chitosan layer acts as an anti-reflex layer. However, there is not obvious absorption peaks in FIG. 18, which indicates that the chitosan layer is not an absorbent film within the waveband. The reflectance of the stainless steel substrate is less than 0.8 and hence is absorbent for solar radiation. As shown in FIG. 19, the stainless steel substrate cannot emit waves of the atmospheric window to radiatively dissipate thermal energy, since it has high reflectance and cannot emit thermal radiations. That is, the stainless steel substrate cannot effectively release thermal energy by emitting mid-infrared radiation after absorbing solar radiation.

Figure 20:
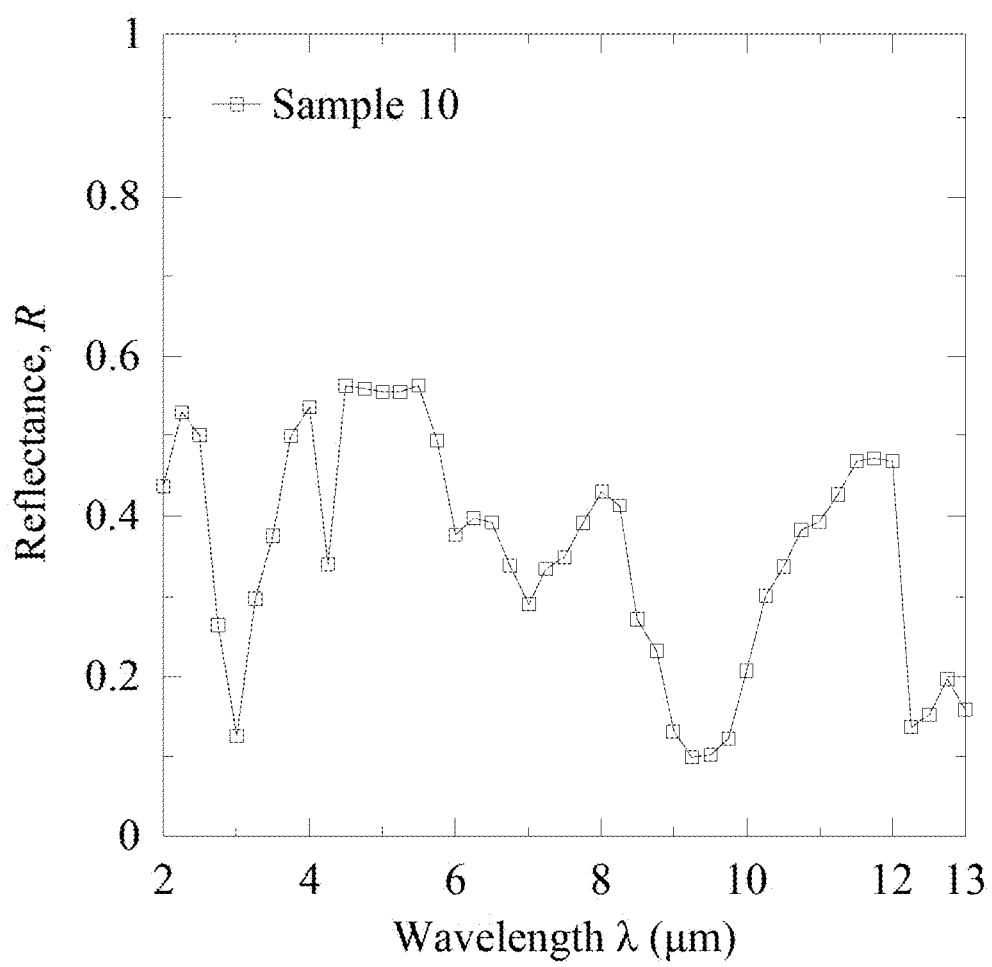
Figure 21:
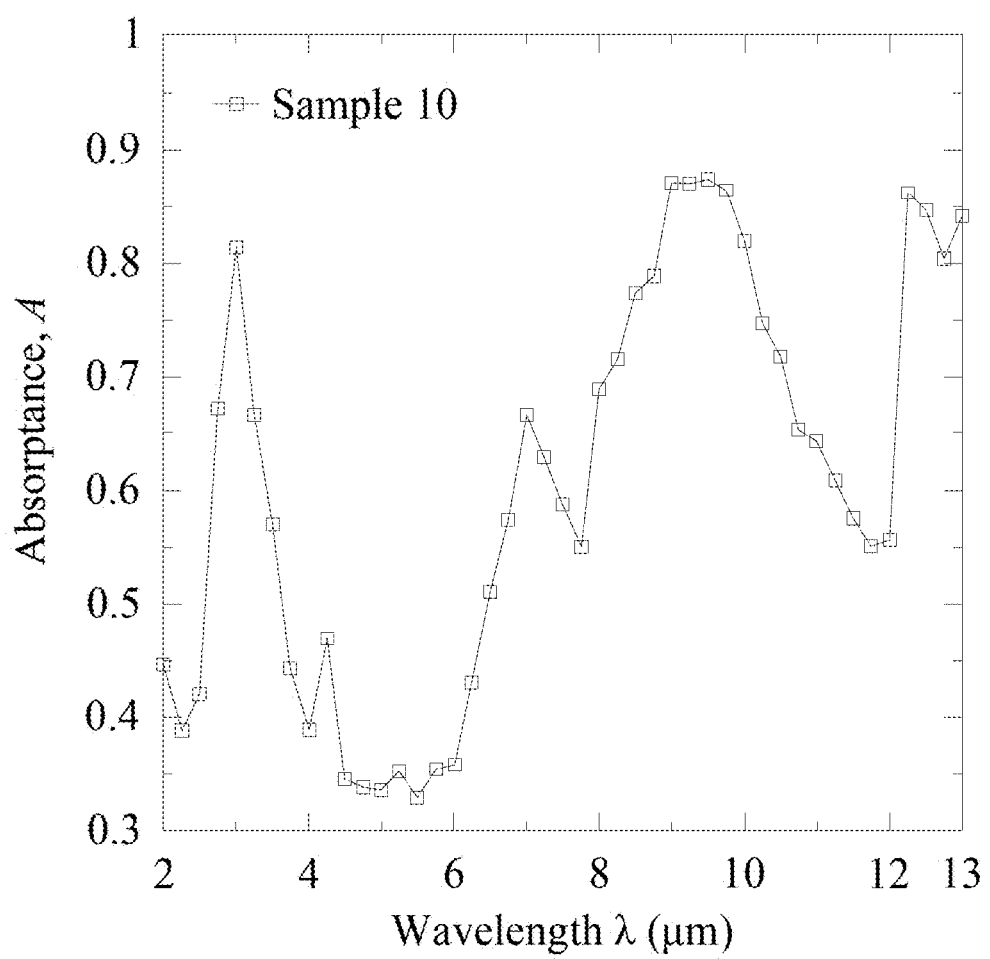

As shown in FIG. 20, the reflectance of the Sample 10 is significantly lower than that of the substrate of the Sample 10. As shown in FIG. 21, the radiative cooling substrate including a stainless steel substrate and a deposited chitosan layer thereon indeed has the function of radiating waves of waveband between 8 μm and 13 μm and indeed has the radiative cooling function.

Figure 22:
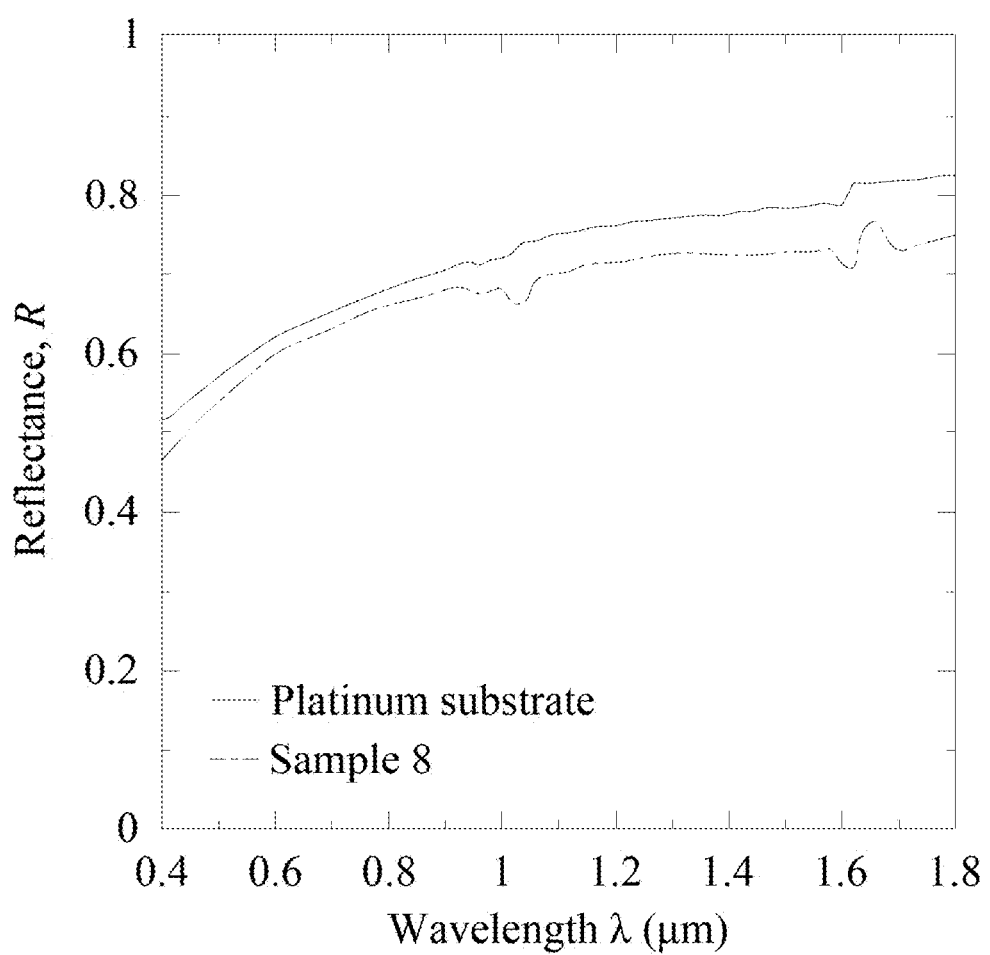
Figure 23:
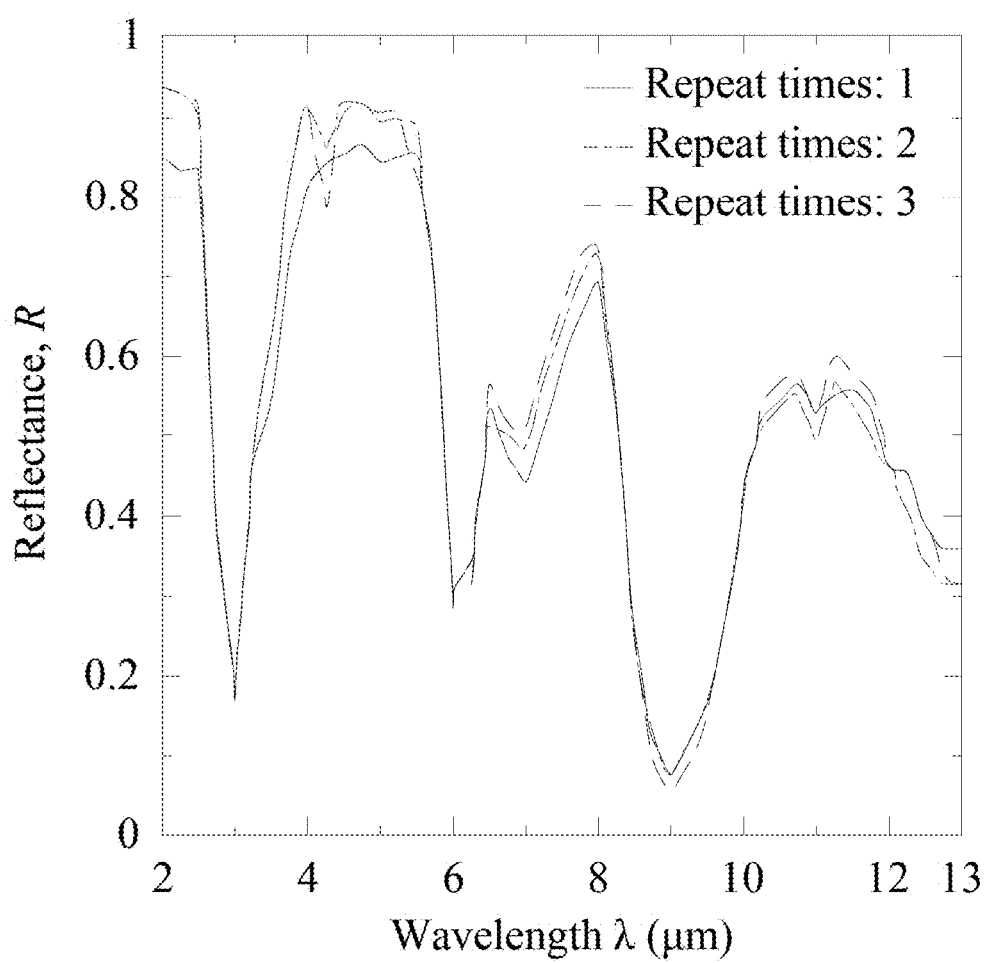
Figure 24:
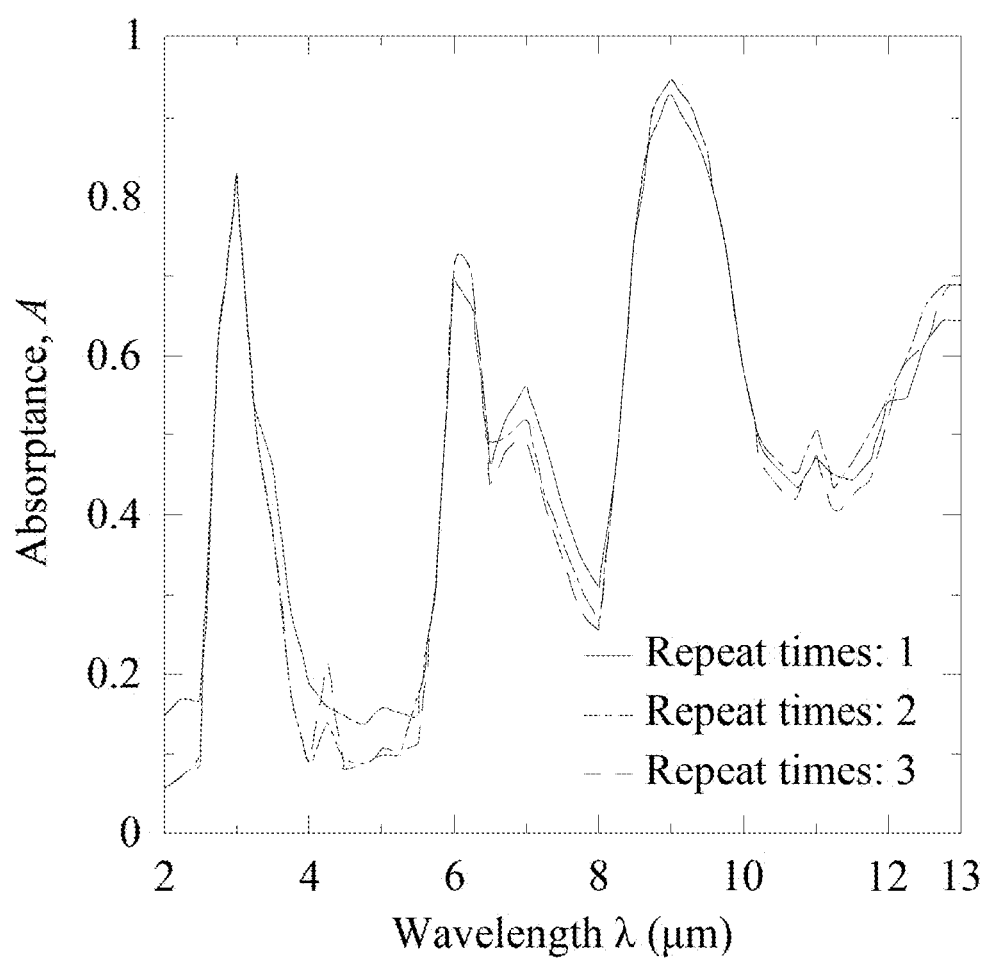

As shown in FIG. 22, the reflectance of the Sample 8 having a deposited chitosan layer on a platinum substrate is slightly lower than that of the platinum substrate, since the platinum substrate is made via the evaporation deposition process and hence is smoother than a stainless surface where interference effects might happen and lead to reduction of reflectance. As shown in FIGS. 23 and 24, the manufacturing method of the present invention has reproducibility and the radiative cooling substrate of the present invention having a chitosan layer deposited on a platinum substrate indeed has the function of radiating waves of waveband between 8 μm and 13 μm and indeed has the radiative cooling function.

Figure 25:
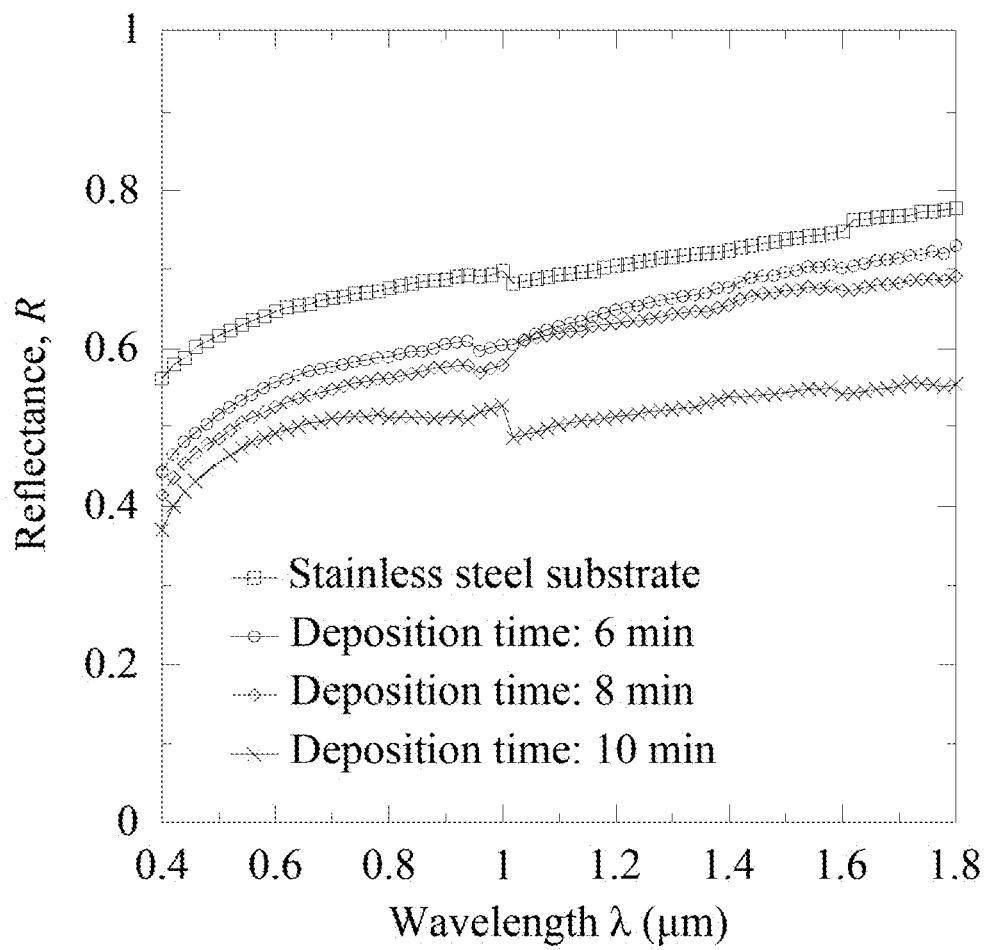
FIG. 25 depicts the radiative characteristics of the radiative cooling substrates of the present invention.

Furthermore, reflectance is measured by hemispherical radiative properties measurement system where the angle of incidence is 8 degrees for different deposition time resulting in different thickness of the chitosan layer is shown in FIG. 25.

Refer to FIG. 25, which depicts the radiative characteristics of the radiative cooling substrates of the present invention. As shown in FIG. 25, which depicts the 8-degree reflectance of a stainless steel substrate and three stainless steel substrates with a chitosan layer deposited thereon, wherein the deposition time of the three stainless steel substrates are 6 min, 8 min and 10 min respectively and wherein the waveband of measurement is 0.4 μm-1.8 μm. The thicknesses corresponding to different deposition time are obtained according to the foregoing area of the current-time curve and the regression equation, and the obtained thicknesses are 4.39 pun, 5.49 μm and 6.52 μm for 6 min, 8 min and 10 min deposition time respectively. When the thickness of the chitosan layer increases, the reflectance of short wavelength waves decreases. When the reflectance decrease by 0.1, the absorption of solar radiation increases by 90 W/m². Therefore, if the reflectance reduction occurs in the waveband of most solar radiation by 0.15, excess solar radiation will be absorbed, which damages the thermal energy dissipation function of the radiative cooling substrate. As shown in FIG. 25, the sample prepared by depositing a chitosan layer on a stainless steel substrate for 6 min has a reflection reduction of about 0.1 in the waveband of 0.4 μm-1 μm relative to the stainless steel substrate therein; the sample prepared by depositing a chitosan layer on a stainless steel substrate for 8 min has a reflection reduction of about 0.14 relative to the stainless steel substrate therein; the sample prepared by depositing a chitosan layer on a stainless steel substrate for 10 min has a reflection reduction of about 0.18 and has a higher reduction in the waveband of 1 μm-1.8 μm relative to the stainless steel substrate therein. Optionally, the maximum thickness (6.52 μm) of the deposited chitosan lay corresponds to a deposition time of 10 min.

Net Radiative Heat Flux

The emission spectrum obtained from a measurement is used to calculate the radiative heat flux of each sample, wherein only the radiative heat exchange is taken into consideration and the heat conduction and the heat convection are both ignored. The spectrum of the incident solar radiation is assumed to be AM 1.5G. Since the hemispherical radiative properties measurement system measures radiations in the waveband between 0.4 µm and 1.8 µm, only the solar radiation absorption of the same waveband is calculated for the incident solar spectrum. Since most of the solar radiations are in the waveband between 0.4 µm and 1 µm, it is reasonable to ignore those wavebands outside this region, i.e., wavelengths shorter than 0.4 µm and longer than 1 µm. Planck's law (Blackbody radiation law) is used to calculate the surface emission of the sample. Calculate the radiated power for the temperatures of 273K and 303K as shown in FIG. 26.

Figure 26:
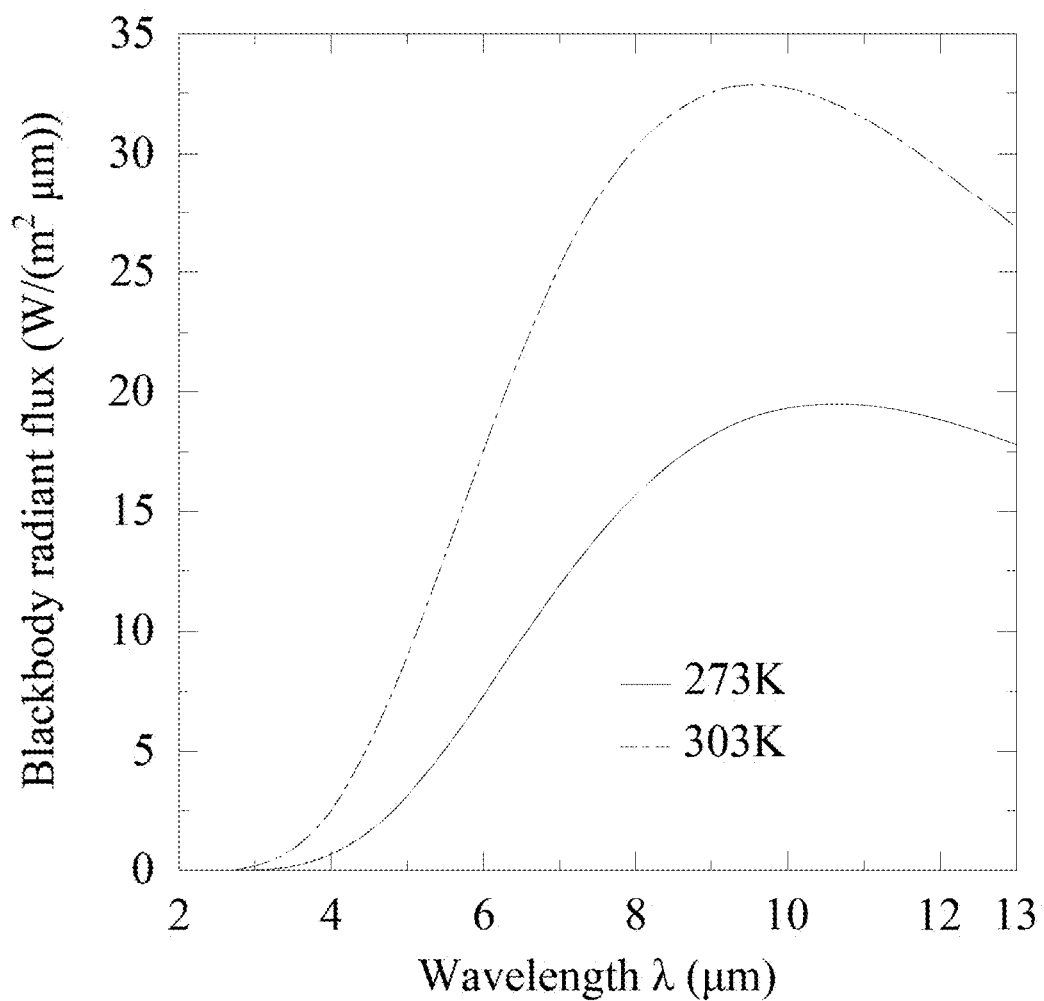
FIG. 26 depicts the radiant flux of a radiative cooling substrate of the present invention.

Refer to FIG. 26, which depicts the radiant flux of a radiative cooling substrate of the present invention, wherein the x-axis represents wavelength and the y-axis represents spectral blackbody emissive power $W/(m^2 \cdot \mu m)$. For the temperature of 273K and 303K, the blackbody emissive spectrum includes the waveband of the atmospheric window. The radiation of the sample can be obtained by multiplying the radiant flux by the radiation spectrum obtained using the long-wavelength hemispherical radiative properties measurement system. Finally, subtract the radiation emitted by the sample from the absorbed solar radiation to obtain a net radiative heat flux of the sample, wherein the wavebands for calculating the absorption energy of the solar radiation are 0.4 µm-1.8 µm and 2 µm-4 µm, and the wavebands for calculating the emission energy are 0.4 µm-1.8 µm, 2 µm-8 µm and 8 µm-13 µm. The surface temperatures of the samples are assumed to be 30° C. and 0° C. respectively. The results are shown in Table 4.

flux of the Sample 10 is 173.3 $W/m^2$, which is lower than the net radiative heat flux of the substrate by 122.5 $W/m^2$. That is, the Sample 10 does have the function of radiative cooling. Further, the Sample 10 has a lower radiative heat flux than the stainless steel substrate therein by 54.7 $W/m^2$ at 0° C., which verifies that the chitosan layer disposed on the stainless steel substrate has the function of radiative cooling. Similarly, the Sample 8 having a chitosan layer disposed on a platinum substrate has the function of radiative cooling.

Function of Thermal Energy Dissipation

In order to verify that the chitosan layer can radiatively cool metals. A thermocouple is used to measure the surface temperature of a stainless sample and that of another stainless steel sample with a chitosan layer deposited thereon in a normal environment. The experimental configuration is shown in FIG. 27.

Figure 27:
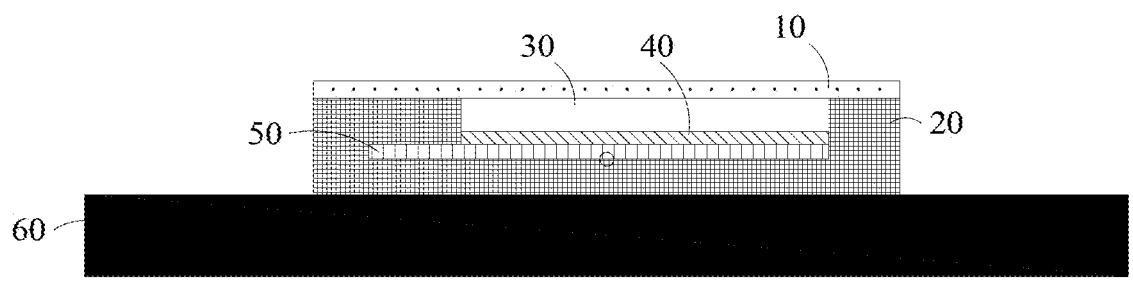
FIG. 27 depicts a temperature measurement device and a radiative cooling substrate of the present invention.
Figure 28:
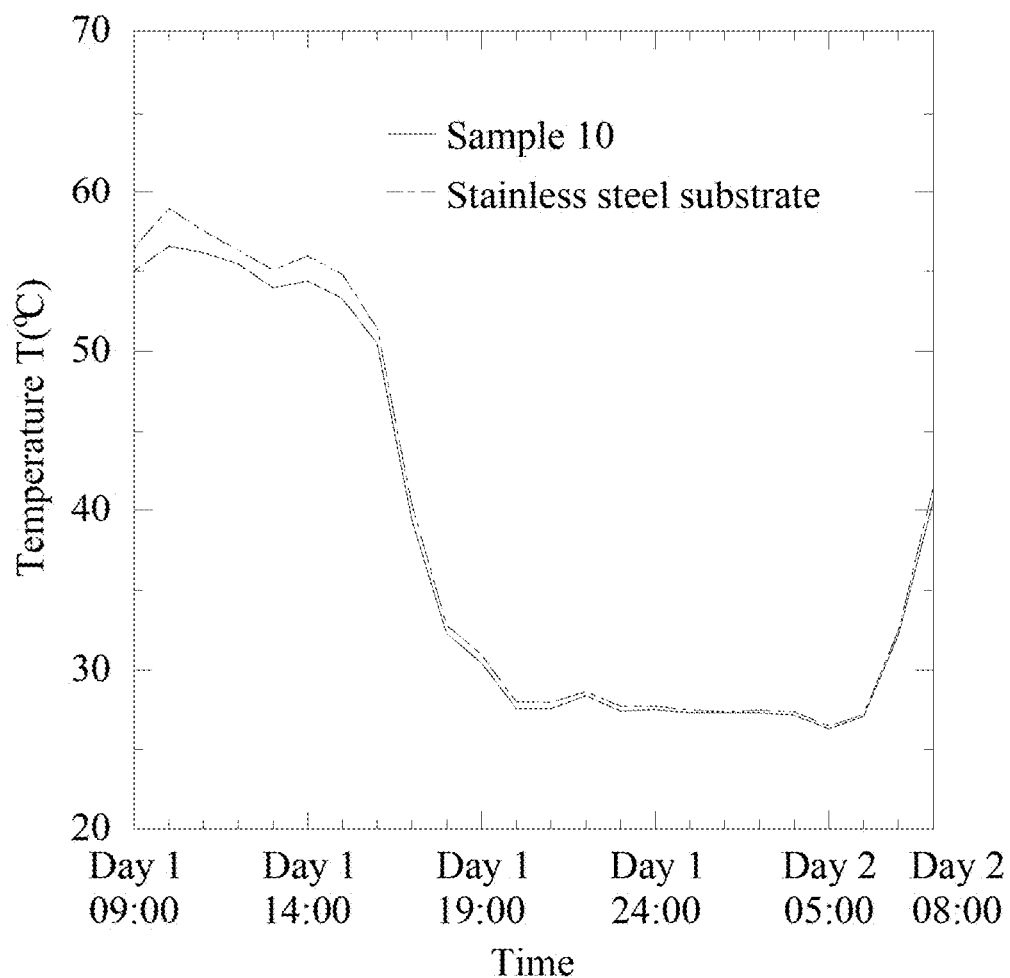
FIG. 28 depicts the surface temperature analysis result of a radiative cooling substrate of the present invention.

Refer to FIG. 27, which depicts a temperature measurement device and a radiative cooling substrate of the present invention. The Sample 10 is selected and the chitosan layer and the metallic substrate are denoted as 40 and 50 respectively. The Sample 10 is placed in the heat insulating material made of polystyrene 20. Since polystyrene 20 is low water-absorptive and the thermal conductivity is 0.0335 W/(m-K), which reduces the influence of thermal convection and thermal conduction. The Sample 10 is measure via the thermocouple 30. A low density vinyl film 10 is adhered on the polystyrene 20, which is used to protect the underlying sample and reduce thermal convection without affecting the radiative properties. In addition, a thermal baffle 60 is disposed beneath to prevent the thermal conduction from the ground. The thermal conductivity coefficient of the thermal baffle 60 is 0.0278 W/(m-K). The test time began at 9:00 AM of 2018 Aug. 19, the test lasted for 24 hours, and the temperature was recorded once every one hour. The results of the sample temperature, the substrate temperature and the temperature difference therebetween are shown in FIG. 28 and Table 5.

TABLE 4

| Item | Temperature | Absorption energy ($W/m^2$) | | Emission energy ($W/m^2$) | | | Radiative heat flux ($W/m^2$) |
|---|---|---|---|---|---|---|---|
| | | 0.4 µm-1.8 µm | 2 µm-4 µm | 0.4 µm-1.8 µm | 2 µm-8 µm | 8 µm-13 µm | |
| Stainless steel substrate | 30° C. | 309.8 | 3.7 | $1.2 \times 10^{-6}$ | 10.1 | 7.3 | 295.8 |
| Sample 10 | | 320.1 | 25.0 | $1.3 \times 10^{-6}$ | 50.7 | 121.1 | 173.3 |
| Stainless steel substrate | 0° C. | 309.8 | 3.7 | $5.7 \times 10^{-8}$ | 4.5 | 4.4 | 304.6 |
| Sample 10 | | 320.1 | 25.0 | $6.1 \times 10^{-8}$ | 22.8 | 72.4 | 249.9 |
| Platinum substrate | 30° C. | 312.3 | 0 | 0 | 0 | 0 | 312.3 |
| Sample 8 | | 342.7 | 8.7 | $1.2 \times 10^{-6}$ | 29.9 | 90.6 | 230.9 |
| Platinum substrate | 0° C. | 312.3 | 0 | 0 | 0 | 0 | 312.3 |
| Sample 8 | | 342.7 | 8.7 | $3.9 \times 10^{-14}$ | 13.7 | 53.9 | 283.8 |

Refer to Table 4, the net radiative heat flux of the stainless steel substrate is 295.8 $W/m^2$ at 30° C., since the reflectance of the stainless steel substrate is over 0.8 in the waveband between 2 µm and 13 µm and the stainless steel substrate almost emits nothing after absorbing solar radiation. However, the absorption energy of the Sample 10 having the chitosan layer on the stainless steel substrate is 320.1 $W/m^2$, since the chitosan layer is anti-reflex and hence contributes a reflectance reduction in the waveband of the solar radiation such that the Sample 10 absorbs more energy than the substrate. However, due to the high emission energy in the waveband between 2 µm and 13 µm, the net radiative heat

TABLE 5

| Time | Sample (°C.) | Substrate (°C.) | difference (°C.) | Time | Sample (°C.) | Substrate (°C.) | difference (°C.) |
|---|---|---|---|---|---|---|---|
| 9:00 | 55 | 56.4 | 1.4 | 21:00 | 27.6 | 27.9 | 0.3 |
| 10:00 | 56.6 | 59 | 2.4 | 22:00 | 28.3 | 28.6 | 0.3 |
| 11:00 | 56.2 | 57.6 | 1.4 | 23:00 | 27.4 | 27.7 | 0.3 |
| 12:00 | 55.6 | 56.3 | 0.7 | 24:00 | 27.5 | 27.7 | 0.2 |
| 13:00 | 54 | 55.1 | 1.1 | 1:00 | 27.3 | 27.5 | 0.2 |
| 14:00 | 54.4 | 56 | 1.6 | 2:00 | 27.3 | 27.4 | 0.1 |

TABLE 5-continued

| Time | Sample (°C.) | Substrate (°C.) | difference (°C.) | Time | Sample (°C.) | Substrate (°C.) | difference (°C.) |
|---|---|---|---|---|---|---|---|
| 15:00 | 53.3 | 54.8 | 1.5 | 3:00 | 27.3 | 27.5 | 0.2 |
| 16:00 | 50.5 | 51.4 | 0.9 | 4:00 | 27.2 | 27.4 | 0.2 |
| 17:00 | 39.5 | 40.3 | 0.8 | 5:00 | 26.3 | 26.5 | 0.2 |
| 18:00 | 32.3 | 32.8 | 0.5 | 6:00 | 27.1 | 27.2 | 0.1 |
| 19:00 | 30.4 | 30.9 | 0.5 | 7:00 | 32.2 | 32.5 | 0.3 |
| 20:00 | 27.6 | 28 | 0.4 | 8:00 | 40.5 | 41.4 | 0.9 |

Refer to FIG. 28, which depicts the surface temperature analysis result of a radiative cooling substrate of the present invention. As shown in FIG. 28 and Table 5, the surface temperature of the Sample 10 remains lower than that of the stainless steel substrate therein. The maximum temperature difference in the daytime is 2.4° C., which means that the chitosan coating successfully reduces the temperature of the metallic substrate.

However, the temperature difference decreases in the nighttime, wherein the possible reason might be that the thermal dissipation process is affected by moisture.

Measure the hemispherical reflectance of a sample, wherein the sample is measured once just after being manufactured and measured again after being exposed to sunlight in order to confirm the stability of the chitosan layer after heat expansion and contraction at different temperatures. The results are shown in FIGS. 29 and 30.

Figure 29:
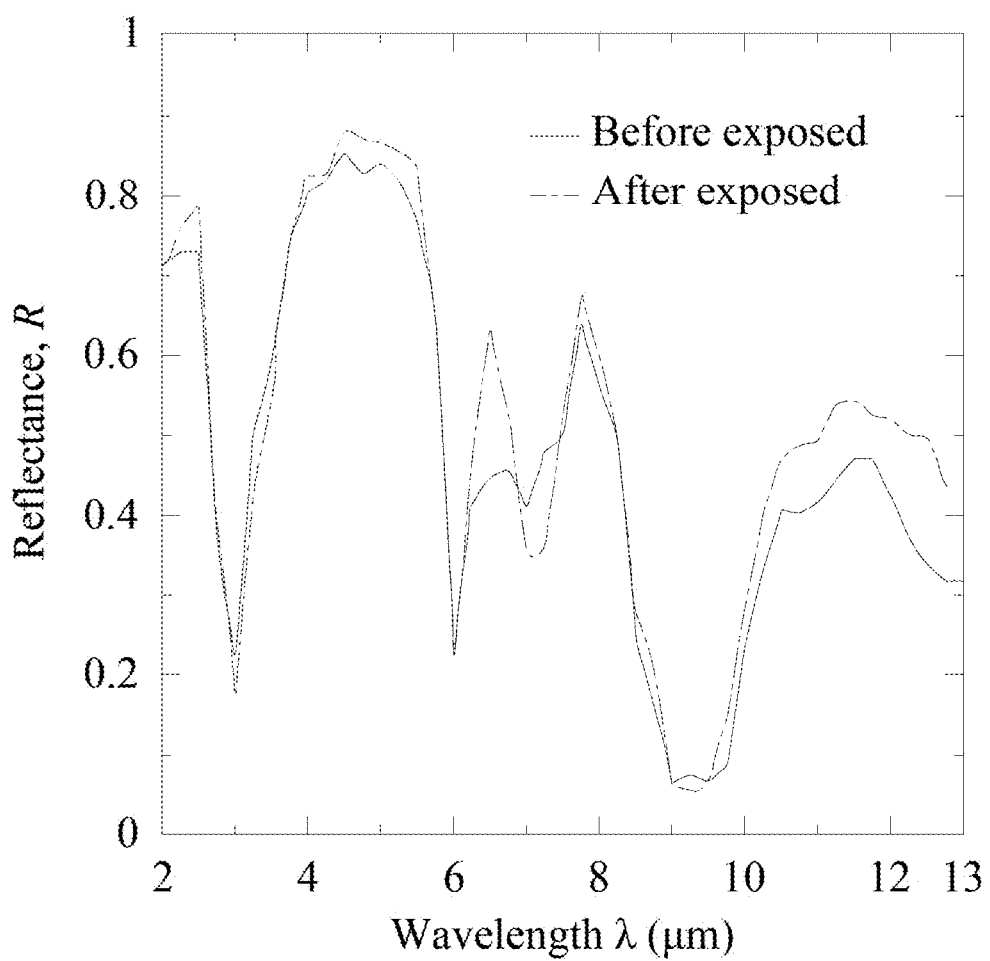
FIG. 29 depicts the analysis result of the hemispherical reflectance of a radiative cooling substrate of the present invention.
Figure 30:
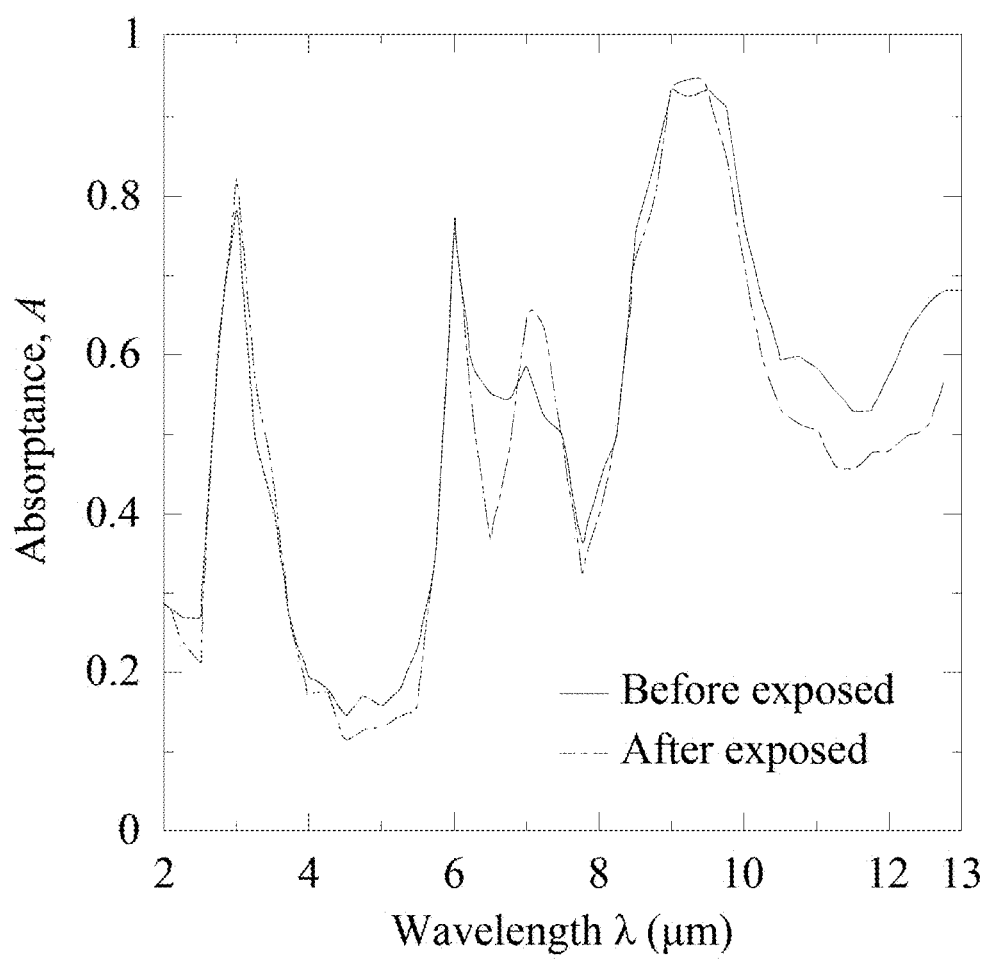
FIG. 30 depicts the absorptance of a radiative cooling substrate of the present invention.

Refer to FIG. 29, which depicts the analysis result of the hemispherical reflectance of a radiative cooling substrate of the present invention. Refer to FIG. 30, which depicts the absorptance of a radiative cooling substrate of the present invention. As shown in FIGS. 29 and 30, the reflectance and absorption rate of the sample before and after the exposure are not much different, which means that the chitosan layer still retains the same radiative properties and the function of thermal energy dissipation at different temperatures.

The above mentioned is illustrative only and not restrictive. Any equivalent modifications or changes made to the spirit and scope of the present invention should be included in the extent of the patent application.

What is claimed is:

1. A manufacturing method of a radiative cooling substrate, comprising:
    forming a metallic substrate by depositing an adhesive layer with a second thickness on a silicon substrate and depositing a metal layer on the adhesive layer in an evaporation process, wherein the adhesive layer comprises chromium or titanium, and the second thickness is 10 nm to 50 nm;
    preparing a chitosan solution, the chitosan solution comprising chitosan and a solvent, wherein the solvent comprises water, C1-C4 alcohols, and an acid, and a pH-value of the chitosan solution is less than seven;
    providing the metallic substrate into an electrophoresis cell loaded with the chitosan solution;
    applying a voltage to the metallic substrate for a predetermined time period;
    depositing a chitosan layer comprising the chitosan with a first thickness on the metallic substrate in an electrophoretic process; and
    obtaining the radiative cooling substrate;
    wherein the first thickness is a value from 0.5 μm to 10 μm.

2. The method of claim 1, wherein a ratio of a weight of the chitosan and a volume of the solvent is 0.01 g: 1000 mL to 20 g: 1000 mL.

3. The method of claim 1, wherein the C1-C4 alcohols comprise ethyl alcohol, and a volume ratio of the water and the ethyl alcohol is less than 2:8.

4. The method of claim 1, wherein the acid comprises acetic acid or hydrochloric acid.

5. The method of claim 1, wherein the voltage is less than 30 V.

6. The method of claim 1, wherein the predetermined time period is less than five minutes.

* * * * *